(12) United States Patent
Izawa et al.

(10) Patent No.: US 10,927,893 B2
(45) Date of Patent: Feb. 23, 2021

(54) SLIDING MEMBER, AND SLIDING MEMBER FOR INTERNAL COMBUSTION ENGINE

(71) Applicants: NISSAN MOTOR CO., LTD., Yokohama (JP); FUKUDA METAL FOIL & POWDER CO., LTD., Kyoto (JP)

(72) Inventors: Yoshinori Izawa, Kanagawa (JP); Junichi Arai, Kanagawa (JP); Katsunori Otobe, Kyoto (JP); Shinichi Nishimura, Kyoto (JP)

(73) Assignees: NISSAN MOTOR CO., LTD., Yokohama (JP); FUKUDA METAL FOIL & POWDER CO., LTD., Kyoto (JP)

( * ) Notice: Subject to any disclaimer, the term of this patent is extended or adjusted under 35 U.S.C. 154(b) by 0 days.

(21) Appl. No.: 16/483,006

(22) PCT Filed: Feb. 2, 2018

(86) PCT No.: PCT/IB2018/000162
§ 371 (c)(1),
(2) Date: Aug. 1, 2019

(87) PCT Pub. No.: WO2018/142223
PCT Pub. Date: Aug. 9, 2018

(65) Prior Publication Data
US 2020/0011211 A1    Jan. 9, 2020

(30) Foreign Application Priority Data
Feb. 3, 2017    (JP) .............................. JP2017-018483

(51) Int. Cl.
*F16C 33/12* (2006.01)
*C22C 9/06* (2006.01)
(Continued)

(52) U.S. Cl.
CPC .............. *F16C 33/122* (2013.01); *C22C 9/06* (2013.01); *C23C 24/04* (2013.01); *F16C 29/02* (2013.01); *F16J 1/02* (2013.01); *F16C 2204/10* (2013.01)

(58) Field of Classification Search
CPC ...... F16C 29/02; F16C 33/122; F16C 33/124; F16C 33/125; F16C 2204/10; F16C 17/12;
(Continued)

(56) References Cited

U.S. PATENT DOCUMENTS 7,993,758 B2 * 8/2011 Wilhelm ................. B32B 15/01
428/626
2006/0093736 A1    5/2006 Raybould et al.
(Continued)

FOREIGN PATENT DOCUMENTS

CN        1926253 A       3/2007
CN      103459667 A      12/2013
(Continued)

*Primary Examiner* — Alan B Waits
(74) *Attorney, Agent, or Firm* — Foley & Lardner LLP

(57) ABSTRACT

A sliding member includes a base substrate and a coating layer formed on the base substrate. The coating layer includes a copper alloy part derived from a plurality of precipitation hardening copper alloy particles. The copper alloy parts are bonded to each other via interfaces between the copper alloy parts. The copper alloy part contains nickel and silicon as additive elements. The copper alloy part contains 2 to 5 percent by mass of nickel.
A sliding member for an internal combustion engine includes the sliding member at a sliding part of the internal combustion engine.

8 Claims, 15 Drawing Sheets

(51) Int. Cl.
 *F16J 1/02* (2006.01)
 *C23C 24/04* (2006.01)
 *F16C 29/02* (2006.01)

(58) Field of Classification Search
 CPC ... F01L 1/022; F01L 1/04; F01L 1/047; F01L
  3/02; F01L 3/04; C22C 1/04; C22C 9/06;
  F16J 1/02; B22F 7/04; C23C 24/04
 See application file for complete search history.

(56) References Cited

U.S. PATENT DOCUMENTS

| | | |
|---|---|---|
| 2014/0069700 A1 | 3/2014 | Hirano et al. |
| 2018/0223902 A1* | 8/2018 | Izawa .................. C23C 28/021 |

FOREIGN PATENT DOCUMENTS

| | | |
|---|---|---|
| GB | 2 492 228 A | 12/2012 |
| JP | 2007-270206 A | 10/2007 |
| JP | 2008-519157 | 6/2008 |
| JP | 2012-201890 A | 10/2012 |
| JP | 2013-002613 A | 1/2013 |
| JP | 2013-067825 A | 4/2013 |
| JP | 5175449 B2 | 4/2013 |
| JP | 5202024 B2 | 6/2013 |
| WO | WO-2017/022505 A1 | 2/2017 |

\* cited by examiner

SLIDING MEMBER, AND SLIDING MEMBER FOR INTERNAL COMBUSTION ENGINE

TECHNICAL FIELD

The present invention relates to a sliding member and a sliding member for an internal combustion engine.

BACKGROUND ART

Patent Document 1 discloses a forming method for a hard coating, which enables forming a hard coating on a surface of a base substrate by cold state strain-induced transformation. The forming method of this hard coating is a method, in which solid metal powder is sprayed onto a surface of the base substrate using compressed gas as a medium, to form a hard metal coating. In this forming method, the metal powder is made of a metal material that can cause strain-induced transformation, which is sprayed onto the base substrate at such a high speed that causes the strain-induced transformation, so that the metal powder is plastically deformed into a flat shape and is deposited as layers on the surface of the base substrate, while also causing strain-induced transformation of the previously deposited metal powder. In this way, the forming method is characterized in that the method forms a metal coating on the surface of the base substrate, in which the coating is harder than the metal powder prior to being sprayed onto the base substrate.

PRIOR ART DOCUMENTS

Patent Documents

Patent Document 1: JP 5202024B

SUMMARY OF INVENTION

Technical Problem

However, there has been a problem with the hard coating in Patent Document 1, as being insufficient in wear resistance.

The present invention has been made in view of the aforementioned problem in the prior art. An object of the present invention is to provide a sliding member with excellent wear resistance, and a sliding member for an internal combustion engine.

Solution to Problem

The present inventors have conducted an intensive study to achieve the aforementioned object. As a result, the present inventors found that the aforementioned object can be achieved by forming a coating layer including predetermined copper alloy portions derived from precipitation-hardening copper alloy particles, in which the copper alloy portions are bonded to each other via interfaces between the copper alloy portions. The present invention has been thus completed.

Advantageous Effect of Invention

According to the present invention, it is possible to provide a sliding member with excellent wear resistance, and a sliding member for an internal combustion engine.

DESCRIPTION OF EMBODIMENTS

The following describes in detail of a sliding member and a sliding member for an internal combustion engine, according to an embodiment of the present invention. The phrase "at least one of A, B, and C" means "(A), (B), (C), (A and B), (A and C), (B and C), or (A, B, and C)".

First Embodiment

First, a sliding member according to a first embodiment of the present invention will be described in detail, with reference to the drawings. The dimensions of the drawings referred to in the following embodiments are exaggerated for descriptive reasons and may be different from the actual dimensions.

Figure 1:
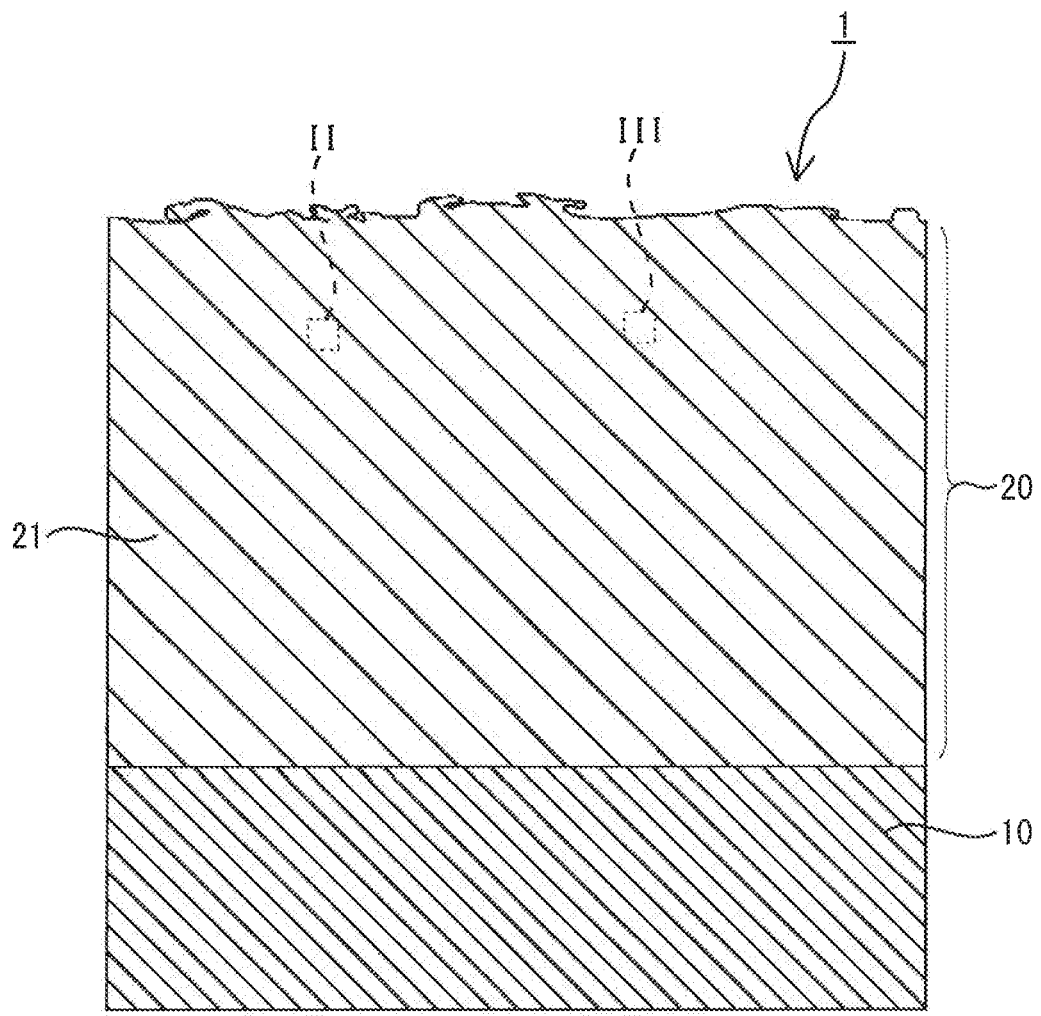
FIG. 1 is a schematic cross-sectional view of a sliding member according to a first embodiment of the present invention.
Figure 2:
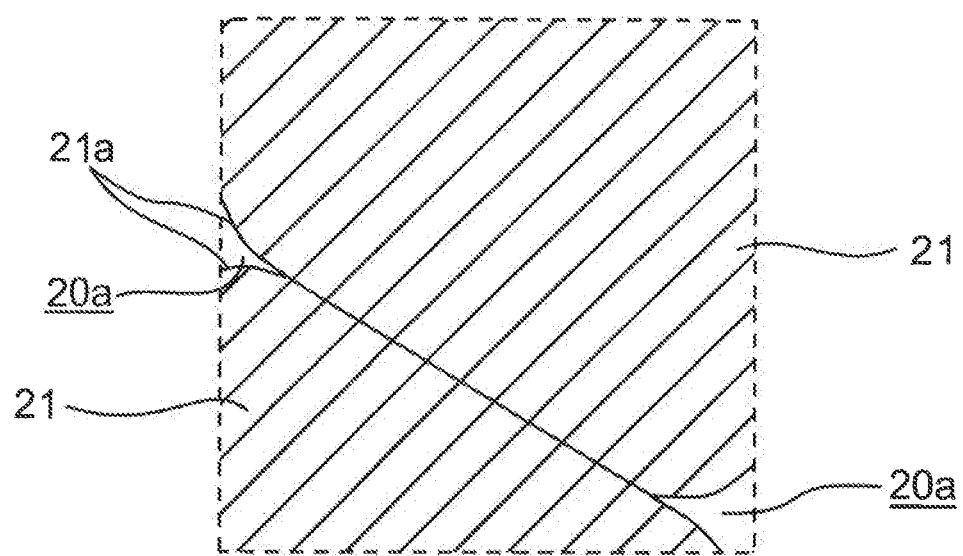
FIG. 2 is an enlarged view of a part surrounded by the line II of the sliding member shown in FIG. 1.
Figure 3:
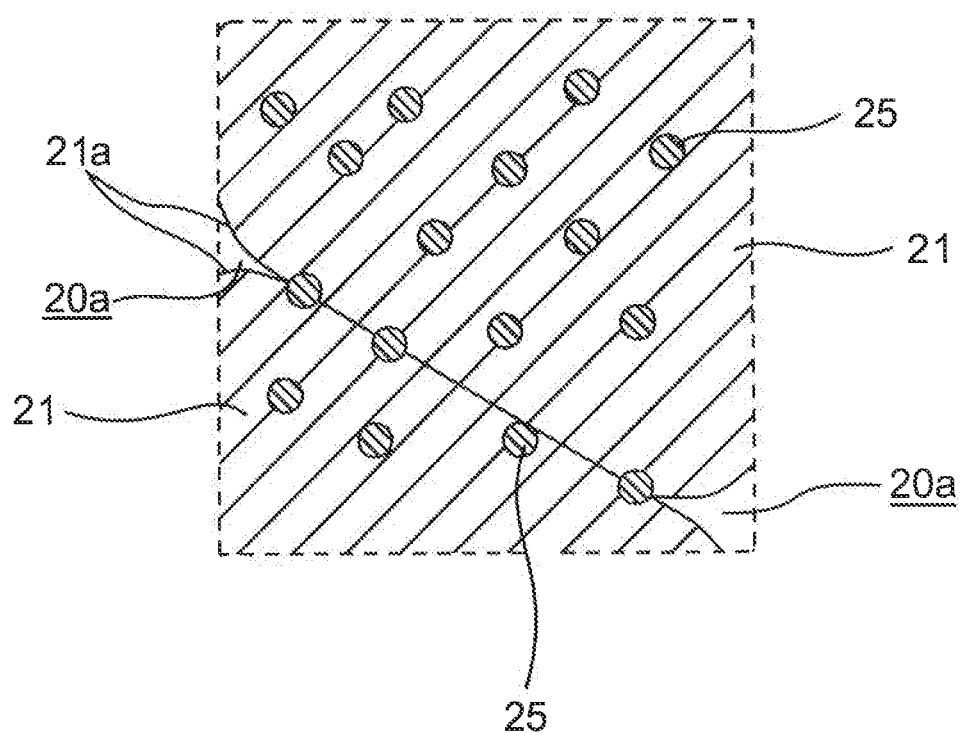
FIG. 3 is an enlarged view of a part surrounded by the line III of the sliding member shown in FIG. 1.

FIG. 1 is a schematic cross-sectional view of the sliding member according to the first embodiment of the present invention. FIG. 2 is an enlarged view of a part surrounded by the line II of the sliding member in FIG. 1. FIG. 3 is an enlarged view of a part surrounded by the line III of the sliding member in FIG. 1. As illustrated in FIGS. 1 and 2, the sliding member 1 of the present embodiment includes a base substrate 10, and a coating layer 20 formed on the base substrate 10. This coating layer 20 includes copper alloy portions 21 derived from precipitation-hardening copper ahoy particles. Moreover, in this coating layers 20, the copper alloy portions 21, 21 are bonded to each other via interfaces 21a between the copper alloy portions. Furthermore, although not illustrated, the copper ahoy portions contain nickel and silicon as additive elements. The copper alloy portion contains 2 to 5 percent by mass of nickel. The coating layer 20 may have pores 20a.

Moreover, as shown in FIG. 3, the sliding member 1 of the present embodiment preferably has at least one of the copper alloy portions 21 contain at least one precipitated phase 25 within the copper alloy portion and in the interface 21a between the copper alloy portions 21, 21. The coating layer 20 may have pores 20a.

In the present invention, the "precipitation-hardening copper alloy" means not only a copper alloy already subjected to precipitation-hardening but also a copper alloy prior to the precipitation-hardening. Of the copper alloy portions, it is preferable that all of the copper alloy portions are the copper alloys already subjected to the precipitation-hardening, however it is not limited to this. For example, of the plurality of the copper alloy portions, a part of the copper alloy portions may be the copper alloy already subjected to precipitation-hardening, and the remainder of the copper alloy portions may be the copper alloy prior to the precipitation-hardening. Moreover, for example, all the copper alloy portions may be made of the copper alloy prior to the precipitation-hardening. The precipitation-hardening copper alloy is also referred to as a particle dispersion strengthened copper alloy.

As described above, the sliding member of the present embodiment includes a base substrate, and a coating layer formed on the base substrate, and is a sliding member whose coating layer has copper alloy portions derived from pre-cipitation-hardening copper alloy particles, whose copper alloy portions are bonded with each other via interfaces between the copper alloy portions, whose copper alloy portions contain nickel and silicon as additive elements, and whose copper alloy portions contain 2 to 5 percent by mass of nickel. Therefore, the sliding member has excellent wear resistance.

Moreover, as described above, in the sliding member of the present embodiment, at least one of the copper alloy portions preferably contains at least one precipitation phase inside the copper alloy portion and in the interface between the copper alloy portions, Such a sliding member has a further excellent wear resistance.

It is currently assumed that the aforementioned effects are obtained based on at least one of the following reasons.

In the copper alloy portions containing nickel and silicon, when a nickel content is 2 to 5 percent by mass, it is considered that precipitation of a compound including nickel, silicon and the like will prevent the copper alloy portions from deforming easily, thus improving their wear resistance. This is also considered to be a result of the precipitation phases being evenly contained in the coating layer, in which the precipitation phases are made of nickel silicide ($Ni_2Si$) that has significant effect in improving the wear resistance. When the nickel content is less than 2 percent by mass, the amount of the precipitation phases made of nickel silicide ($Ni_2Si$) having improvement effects in wear resistance formed in the coating layer is not sufficient. Moreover, when the nickel content exceeds 5 percent by mass, the precipitation phases made of nickel silicide ($Ni_2Si$) having excellent improvement effects in wear resistance are not evenly formed in the coating layer. Although it is not particularly limited, the ratio of the nickel content and the silicon content (Ni:Si) in mass ratio preferably ranges from 3.5:1 to 4.5:1. Moreover, the silicon content preferably ranges from 0.5 to 1.25 percent by mass. However, it is needless to say that the above contents and ratio are not limited to these ranges, and may be out of these ranges as long as the effects of the present invention can be exhibited.

It is also considered that the effects are obtained, for example, due to the followings: when precipitation-hardening copper alloy particles (hereinafter, may also be referred to as "copper alloy particles") serving as a material used in the manufacturing method of the sliding member are sprayed onto the base substrate, and the copper alloy particles collide with the base substrate and the copper alloy portions adhered on the base, kinetic energy thereof is partially converted to thermal energy. This conversion promotes deposition and atomic diffusion between the base substrate and the copper alloy particles and between the copper alloy particles and the copper alloy portions, thus causing even formation of the precipitation phases. This will be described later in detail.

However, it is needless to say that the scope of the present invention will include other cases where the aforementioned effects are obtained based on reasons other than those described above.

In the present invention, "the copper alloy portions are bonded to each other via interfaces between the copper alloy portions" means that at least one of deposition, atomic diffusion, and furthermore, biting (penetration) and formation of a plastically deformed portion (described later in detail) has occurred between the copper alloy portions. In the first or second embodiment, the biting (penetration) or the formation of the plastically deformed portion may occur.

The following describes the components in further detail.

The base substrate 10 is not particularly limited. However it is preferably a metal that is applicable for the method for manufacturing the sliding member, namely, the method for forming the coating layer, which will be described in detail later. Moreover, in a case the sliding member is used as a sliding member for an internal combustion engine, it is needless to say that the base substrate is preferably one usable under a high temperature environment in which the sliding member will be applied.

Examples of metals that are preferably applied include alloys of aluminum, iron, titanium, copper and the like known in the art.

Examples of the aluminum alloys that are preferably applied include AC2A, AC8A, ADC12 specified in the Japanese Industrial Standards. Examples of the iron alloys that are preferably employed include SUS304 specified in the Japanese Industrial Standards and iron-based sintered alloys. Examples of copper alloys that are preferably applied include beryllium copper and copper-alloy-based sintered alloys.

The coating layer 20 is not particularly limited in its porosity. However, in terms that a high porosity in the coating layer may cause insufficient strength and low wear resistance, the porosity of the coating layer is preferably as low as possible. Further, in terms of achieving a sliding member having a high thermal conductivity, the porosity of the coating layer in a cross section thereof is preferably 3 area % or less, is more preferably 1 area % or less, and is particularly preferably 0 area %. Since it is currently possible to reduce the porosity to 0.1 area %, it is preferable to have the porosity range from 0.1 area % to 3 area % in terms of achieving excellent wear resistance, improvement in productivity and like in a good balance. However, it is needless to say that the porosity is not limited to these ranges and may be out of these ranges as long as the effects of the present invention can be exhibited. The porosity of the coating layer in its cross section can be calculated by observation of, for example, a scanning electron microscopic (SEM) image of a cross section of the coating layer, and image processing such as binarization of the scanning electron microscopic (SEM) image.

Furthermore, the thickness of the coating layer 20 is not particularly limited. Namely, the thickness of the coating layer may be suitably adjusted according to the temperature and sliding environment of the portion to which the coating layer is applied. For example, the thickness ranges preferably from 0.05 mm to 5.0 mm, more preferably from 0.1 mm to 2.0 mm. When the thickness of the coating layer is less than 0.05 mm, the rigidity of the coating layer itself becomes insufficient, which may result in plastic deformation particularly when the strength of the base substrate is low. When the thickness of the coating layer is greater than 10 mm, the coating may peel off due to the relationship of the residual stress generated in film formation with the interfacial adhesion strength.

The precipitation-hardening copper alloy contained in the copper alloy portions 21 is not particularly limited, as long as it contains nickel and silicon, and the nickel content ranges from 2 to 5 percent by mass. It is preferable to apply a so-called corson alloy. This imparts the excellent wear resistance.

However, the precipitation-hardening copper alloy is not limited to those mentioned above. For example, a precipitation-hardening copper alloy, to which chromium, zirconium, or vanadium is further added alone or in any combination thereof, may be applied. This allows for applying various materials in accordance with a specification required for the sliding member. It is needless to say that other elements can be further added to the aforementioned precipitation-hardening copper alloys.

Second Embodiment

Next describes in detail a sliding member according to a second embodiment of the present invention, with reference to the drawings. Components identical to those described in the aforementioned embodiment will be assigned with the same reference signs, and descriptions thereof will be omitted.

Figure 4:
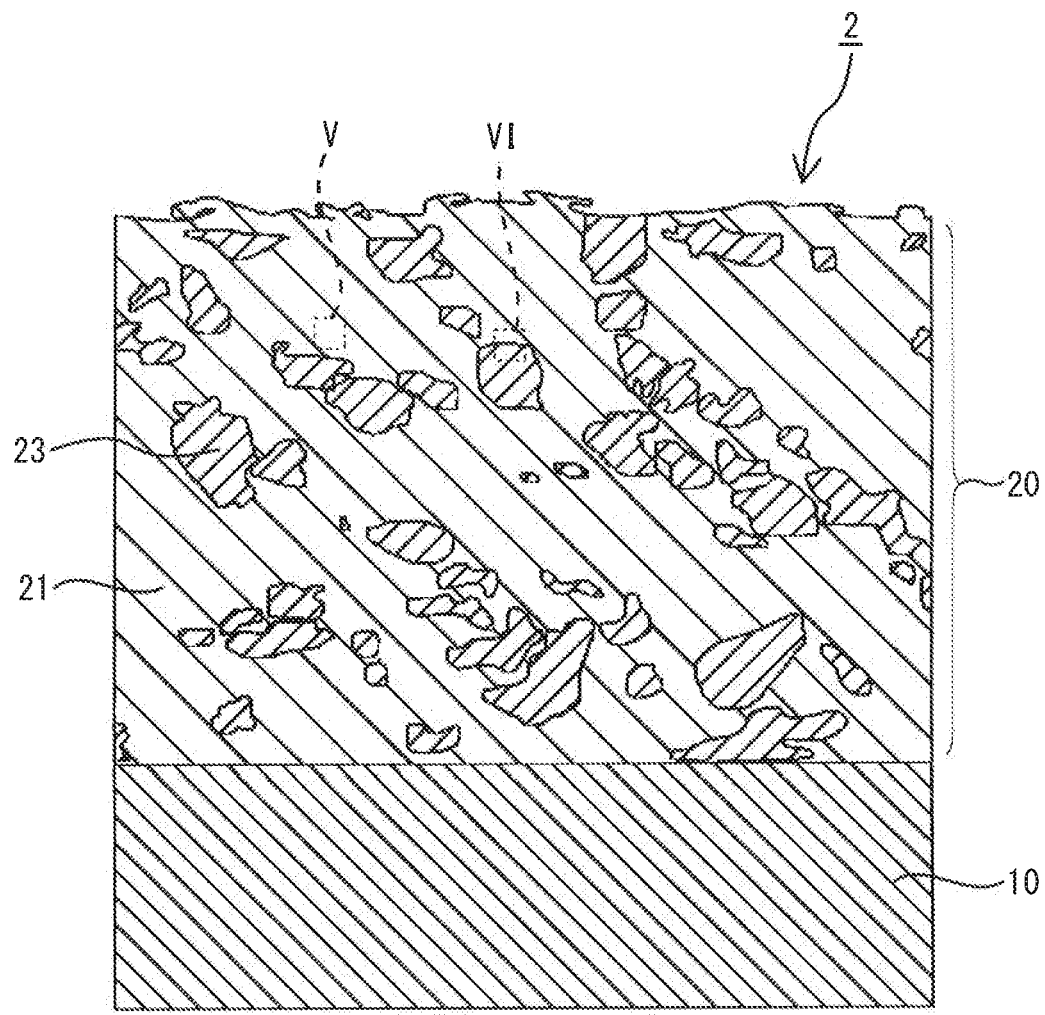
FIG. 4 is a schematic cross-sectional view of a sliding member according to a second embodiment of the present invention.
Figure 5:
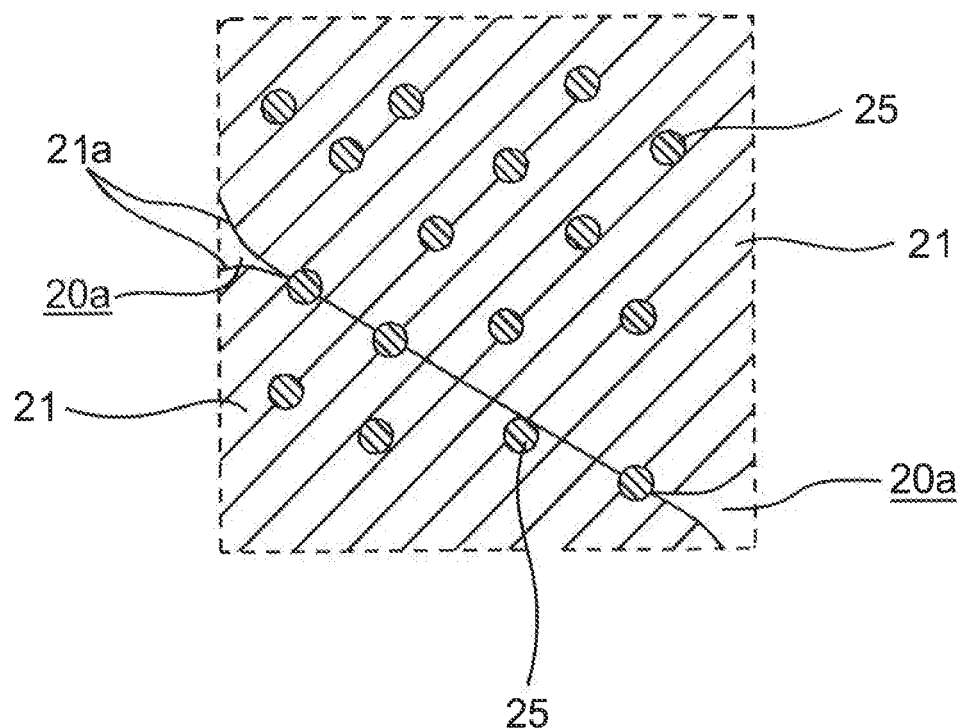
FIG. 5 is an enlarged view of a part surrounded by the line V of the sliding member shown in FIG. 4.
Figure 6:
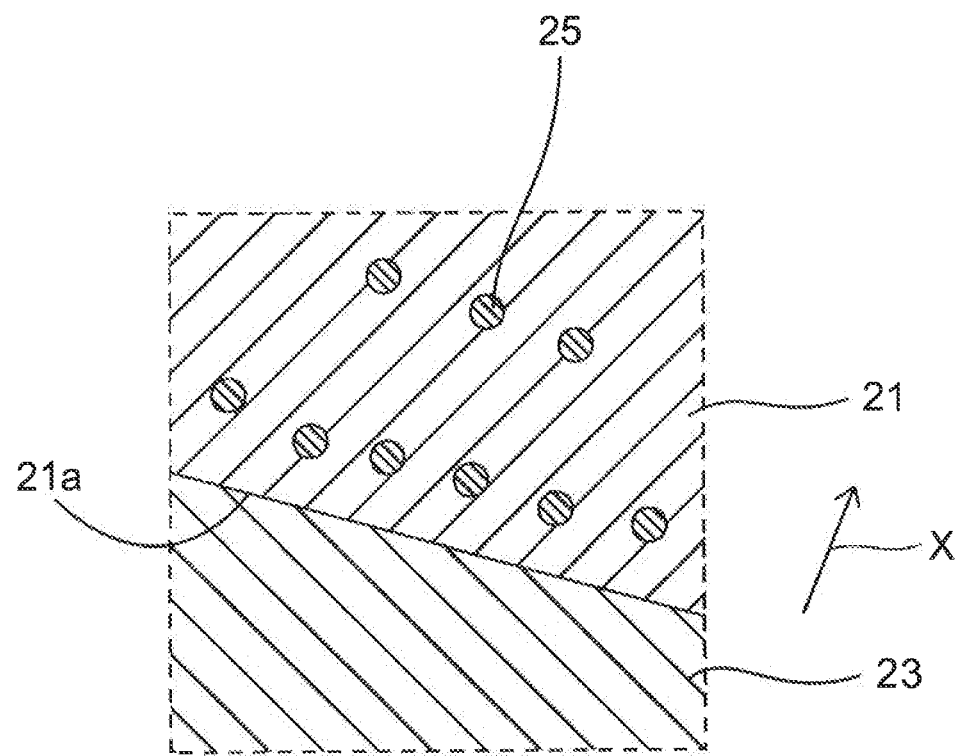
FIG. 6 is an enlarged view of a part surrounded by the line VI of the sliding member shown in FIG. 4.

FIG. 4 is a schematic cross-sectional view of a sliding member according to a second embodiment of the present invention. FIG. 5 is an enlarged view of a part surrounded by the line V of the sliding member shown in FIG. 4. FIG. 6 is an enlarged view of a part surrounded by the line VI of the sliding member shown in FIG. 4. As shown in FIGS. 4 to 6, the sliding member 2 of the present embodiment differs from the sliding member of the first embodiment described above in that the coating layer 20 includes hard particle portions 23 that are harder than the copper alloy portions 21 and derived from hard particles, and for example, the copper alloy portions 21, 21, the copper alloy portion 21 and the hard particle portion 23, and the hard particle portions 23, 23 are bonded to each other via interfaces therebetween.

Moreover, as shown in FIG. 5, in the sliding member 2 of the present embodiment, at least one of the copper alloy portions 21 preferably contains at least one precipitation phase 25 inside the copper alloy portion 21 and in the interface 21a between the copper alloy portions 21, 21. The coating layer 20 may have pores 20a.

Furthermore, as shown in FIG. 6, in the sliding member 2 of the present embodiment, the hard particle portions 23 are harder than the copper alloy portions 21. This facilitates the precipitation of the precipitation phase 25 in the vicinity of the interface 21a of the copper alloy portion 21 adjacent to the hard particle portion 23 (in this specification, "in the vicinity of the interface of the copper alloy portion" indicates, for example, a region of up to about 1 μm inwards of the copper alloy portion 21 from the interface 21a, as shown by the arrow X in the figure), and the precipitation phases 25 containing nickel silicide ($Ni_2Si$) may readily be contained evenly. The coating layer 20 may have pores 20a.

As described above, the sliding member of the present embodiment includes a base substrate, and a coating layer formed on the base substrate, wherein the coating layer includes the aforementioned predetermined copper alloy portions and the hard particle portions being harder than the copper alloy portions, and these portions (e.g. a copper alloy portion to another copper alloy portion, a copper alloy portion to a hard particle portion, and a hard particle portion to another hard particle portion) are bonded to each other via interfaces therebetween. Thus, the sliding member has further excellent wear resistance.

It is currently assumed that the aforementioned effects are obtained based on at least one of the following reasons.

It is considered that the effects are obtained, for example, due to the followings: when a mixture containing the copper alloy particles serving as a material used in the manufacturing method of the sliding member, and the hard particles being harder than the copper alloy particles, is sprayed onto the base substrate and the hard particles collide with the base substrate, if for example the base substrate has on its surface an oxide coating that inhibits adhesion of the base substrate and the coating layer, that oxide coating is removed, to expose and form a new interface of the base substrate that exhibits excellent adhesion with the coating layer. This will be described in detail later.

It is also considered that the effects are obtained, for example, due to the followings: when the copper alloy particles and the hard particles are sprayed onto the base substrate and the hard particles collide with the copper alloy portions adhered on the base substrate, that kinetic energy is partially converted into thermal energy, which promotes deposition and atomic diffusion in the copper alloy portions, thus forming the precipitation phase evenly.

It is considered that the copper alloy portions 21, 21, as well as the copper alloy portion 21 and hard particles 23 bond relatively easier than the hard particles 23, 23.

However, it is needless to say that the scope of the present invention includes cases in which the aforementioned effects are obtained based on reasons other than those described above.

The hard particle portions 23 will be described in more detail. The hard particle portions are not particularly limited, as long as they are harder than the copper alloy portion. For example, it is possible to apply alloy particle portions or ceramic particle portions, or alternatively hard particle portions mixing these at any proportion. Moreover, although not particularly limited, the hard particle portions are preferably harder than the base substrate. Furthermore, for example, in terms of achieving alloy particle parts having a further excellent wear resistance, it is preferable to apply iron-based alloy particles, cobalt-based alloy particles, chromium-based alloy particles, nickel-based alloy particles, or molybdenum-based alloy particles, or hard particles mixing these particles at any proportion.

For example, the Vickers hardness measured and calculated according to the Vickers hardness test defined in the Japanese Industrial Standards (JIS Z 2244) may be used as an indicator of hardness of the copper alloy portion and the hard particle portion, furthermore copper alloy particles and hard particles later described in detail. Moreover, an arithmetic mean value is used as the Vickers hardness, the arithmetic mean value being obtained by measuring approximately three to thirty particles, at least three to five particles for particles, and approximately three to thirty positions, at least three to five positions for the copper alloy portions and hard particle portions in the coating layer. Furthermore, when measuring and calculating the Vickers hardness of the copper alloy portion and the hard particle portion, observations of scanning electron microscope (SEM) images and transmission electron microscope (TEM) images, and energy dispersive X-ray (EDX) spectrometry and the like may be combined if necessary.

Examples of the aforementioned iron-based alloys include SUS 440C specified in the Japanese Industrial Standards. Examples of the cobalt-based alloys include TRIBALOY (registered trademark) T-400, T-800. Examples of the chromium-based alloys include ferrochromium. Examples of the nickel-based alloys include TRIBALOY (registered trademark) T-700. Examples of the molybdenum-based alloys include ferromolybdenum. Examples of the ceramics include WC/Co, $Al_2O_3$. Among these, it is preferable to use the cobalt-based alloy with excellent wear resistance. Specifically, it is preferable to use those such as TRIBALOY (registered trademark) T-400, T-800.

Although not particularly limited, the proportion of the hard particle portion in the cross section of the coating layer, in terms of improving the wear resistance and also the thermal conductivity depending on the needs, ranges preferably from 1 area % to 50 area %, more preferably from 1 area % to 25 area %, still more preferably from 1 area % to 18 area %, particularly preferably from 5 area % to 18 area %. It is needless to say, however, that the proportion is not limited to these ranges and may be out of these ranges as long as the effects of the present invention can be exhibited. The proportion of the hard particle portion in the cross section of the coating layer can be calculated by observation of a scanning electron microscopic (SEM) image of the cross section of the coating layer, and image processing of the scanning electron microscopic (SEM) image such as binarization. Moreover, it is needless to say that area % calculated by observation of a cross section can be regarded as volume %, and volume % can be converted to weight % using the density of the particles.

As described above, the proportion of the hard particle portion in the cross section of the coating layer ranges preferably from 1 area % to 50 area % in terms of improving the wear resistance and the thermal conductivity. However, for an application that does not essentially require high thermal conductivity but requires excellent wear resistance, the proportion of the hard particle portion in the cross section of the coating layer may range from 50 area % to 99 area %. Moreover, this may include a part other than the copper alloy portions and the hard particle portions.

Moreover, the hard particle portions 23 are not particularly limited as long as the hard particle portions 23 are harder than the copper alloy portions. However, in terms of increasing a contacting area with the copper alloy portion and allowing improvement in wear resistance, it is preferable to have a non-spherical shape.

The "the hard particle portion has a non-spherical shape" herein means that an aspect ratio of the hard particle portion is not less than 1.3 in its median value. Although not particularly limited, more specifically, the aspect ratio of the hard particle portion is preferably ranged from 1.3 to 2.0 in median value. The "aspect ratio" is defined as (maximum long diameter/width orthogonal to maximum long diameter) in each hard particle portion, when any cross section is observed along their layer thickness direction of the coating layer with a scanning electron microscope (SEM). Furthermore, the "maximum long diameter" means a maximum distance among distances between any two points on the contour of the hard particle portion of when observing any cross section along a layer thickness direction of the coating layer with the scanning electron microscope (SEM). When calculating the median value of the aspect ratio, for example approximately three to thirty, at least approximately three to five hard particle portions observed in several to dozens of views need to be measured.

Third Embodiment

Next, a sliding member according to a third embodiment of the present invention will be described in detail, with reference to the drawings. Components identical to those described in the aforementioned embodiment will be assigned with the same reference signs, and descriptions thereof will be omitted.

Figure 7:
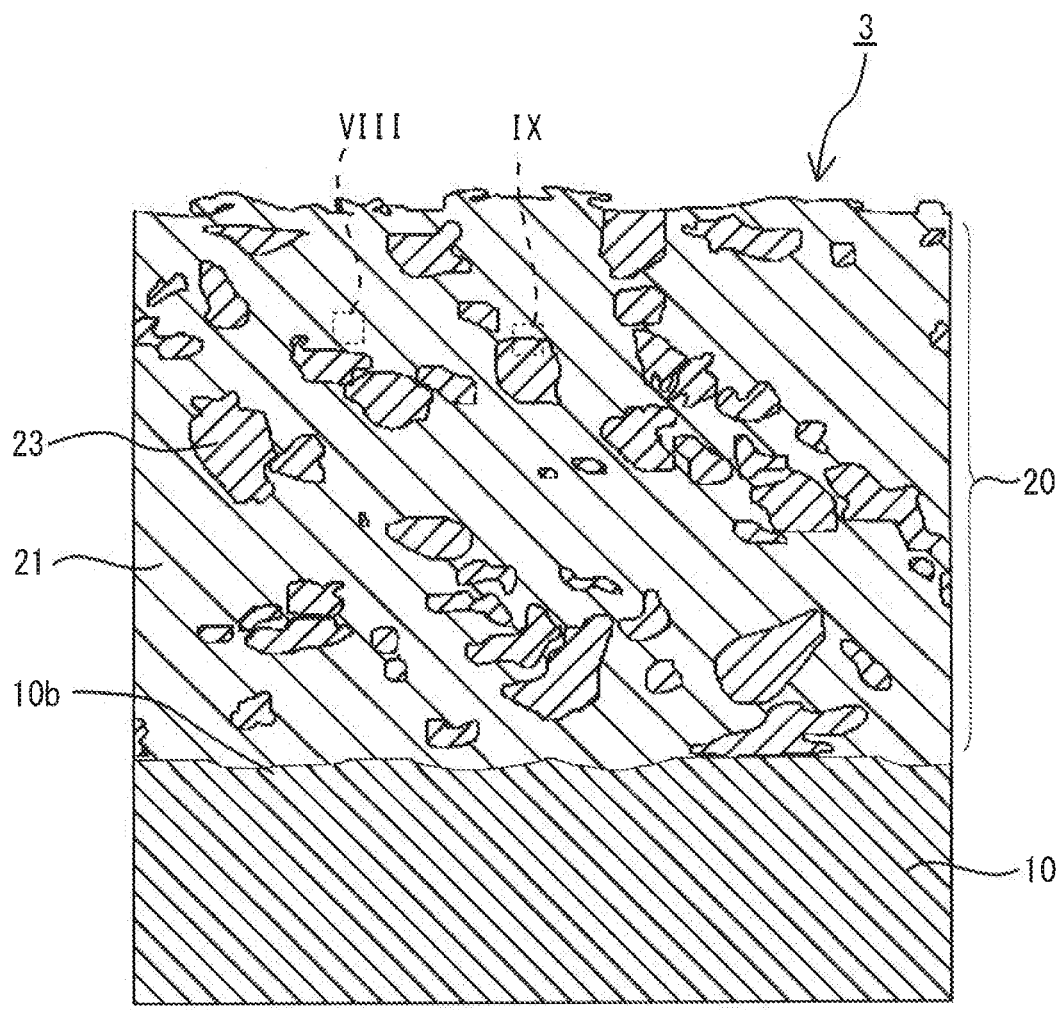
FIG. 7 is a schematic cross-sectional view of a sliding member according to a third embodiment of the present invention.
Figure 8:
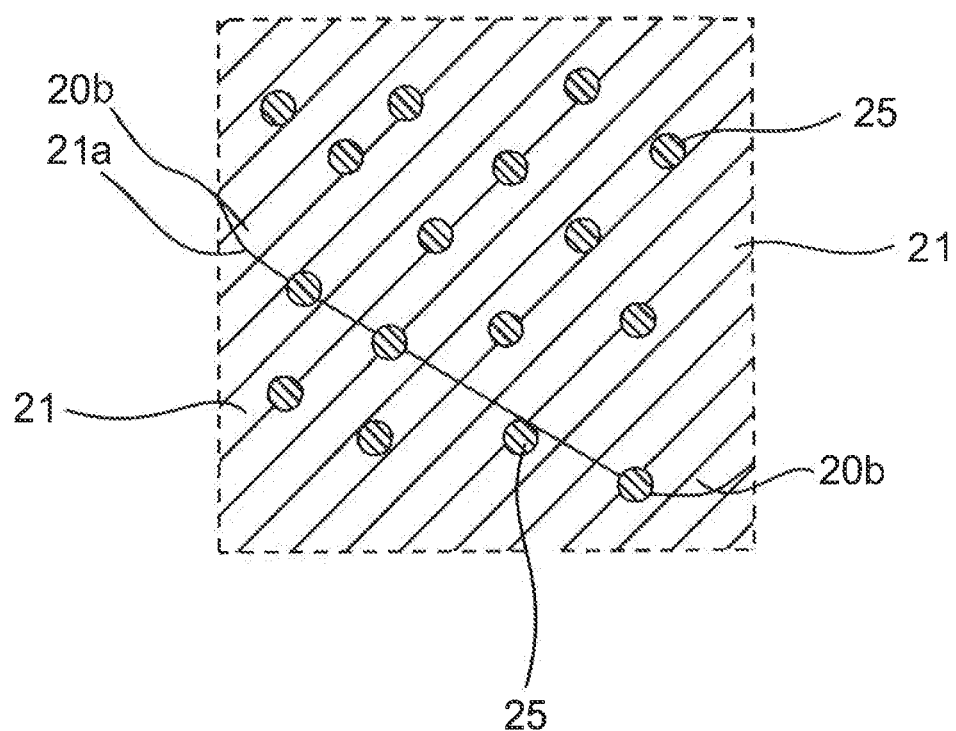
FIG. 8 is an enlarged view of a part surrounded by the line VIII of the sliding member shown in FIG. 7.
Figure 9:
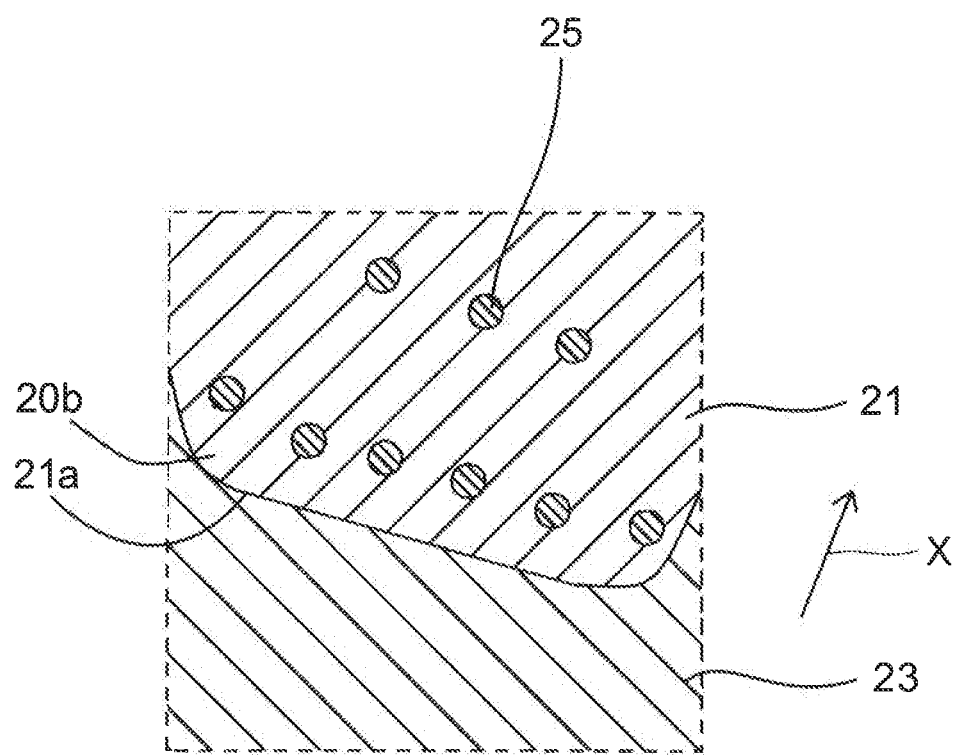
FIG. 9 is an enlarged view of a part surrounded by the line IX of the sliding member shown in FIG. 7.

FIG. 7 is a schematic cross-sectional view of a sliding member according to a third embodiment of the present invention. FIG. 8 is an enlarged view of a part surrounded by the line VIII of the sliding member shown in FIG. 7. FIG. 9 is an enlarged view of a part surrounded by the line IX of the sliding member shown in FIG. 7. As shown in FIG. 7 to FIG. 9, a sliding member 3 of the present embodiment is different from the sliding member of the aforementioned first or second embodiment in that the base substrate 10 has plastically deformed portions 10b made of flat recessed parts, and that the coating layer 20 has plastically deformed portions 20b having a structure in which a copper alloy portions with flat shape 21 are accumulated. Although not illustrated, it is needless to say that the scope of the present invention includes a case in which the coating layer is formed from only the copper alloy portions among the copper alloy portions and the hard particle portions and a case in which one of the base substrate and the coating layer has the plastically deformed portion.

As described above, the sliding member of the present embodiment includes a base substrate, and a coating layer formed on the base substrate, and is a sliding member whose coating layer has the aforementioned predetermined copper alley portions, further having hard particle portions being harder than the copper alloy portions if necessary, and these portions (e.g. a copper alloy portion to another copper alloy portion, a copper alloy portion to a hard particle portion, and a hard particle portion to another hard particle portion) being bonded to each other with the interface therebetween, and furthermore, at least one of the base substrate and the coating layer has at least one plastically deformed portion. Thus, the sliding member has further excellent wear resistance.

It is currently assumed that the aforementioned effects are obtained based on at least one of the following reasons.

It is considered that the effects are obtained by the followings: when a mixture containing the copper alloy particles and hard particles harder than the copper alloy particles, as a material used in the manufacturing method of the sliding member, is sprayed onto the base substrate, and the hard particles collide with the base substrate, if the base substrate has on its surface an oxide coating that inhibits the adhesion of the base substrate with the coating layer, that oxide coating is removed, to expose and form a new interface of the base substrate that exhibits excellent adhesion with the coating layer. This will be described in detail later.

It is also considered that the effects are obtained by, for example, upon collision of the copper alloy particles with the base substrate and the copper alloy portion adhered on the base substrate, that kinetic energy is partially converted to thermal energy, which promotes deposition and atomic diffusion between the base substrate and the copper alloy particles, or between the copper alloy particles and the copper alloy portion.

It is further considered that the effects are obtained by an anchor effect due to biting of the copper alloy particles into the base substrate when the copper alloy particles collide with the base substrate, which improves the adhesion between the base substrate and the coating layer. Namely, as described above, it is considered that the effects are obtained by the improvement in adhesion between the base substrate and the coating layer, by the formation of the plastically deformed portions including the flat recessed parts on the base substrate.

Moreover, it is considered that the effects are obtained by the improvement in the adhesion between the copper alloy portions in the coating layer due to the copper alloy particles and the copper alloy portions becoming flat shaped when the copper alloy particles collide with the base substrate and the copper alloy portion adhered on the base substrate. Namely, as described above, it is also considered that the effects are obtained by a gap (pore) between the copper alloy portions being reduced due to the formation of plastically deformed parts having a structure in which copper alloy portions with flat shape are accumulated on the coating layer, which improves the adhesion between the copper alloy portions in the coating layer. For example, in FIG. 5, the coating layer 20 may have pores 20a. On the other hand, in FIG. 8, the pores in the coating layer 20 decreases and they are hardly observed.

Furthermore, it is also considered that the effects are obtained by the progress in deposition and atomic diffusion between the base substrate and the copper alloy particles or between the copper alloy particles and the copper alloy portions due to heat generation caused by plastic deformation, in the process in which flat recessed parts are formed on the base substrate when the copper alloy particles collide with the base substrate or the copper alloy portions adhered on the base substrate, or in the process in which the copper alloy particles and copper alloy portions become flat shaped, in other words, in the process in which the plastically deformed portions are formed on the base substrate or the coating layer.

It is further considered that the effects are obtained by an anchor effect due to biting of the hard particles into the base substrate or the copper ahoy portions when the hard particles or the copper alloy portions adhered on the base substrate, which improves the adhesion between the base substrate and the coating layer. Namely, as described above, it is considered that the effects are obtained by the improvement in adhesion between the base substrate and the coating layer, by the formation of the plastically deformed portions including the flat recessed parts on the base substrate.

It is further considered that the effects are obtained by the improvement in the adhesion between the copper alloy portions and the hard particles in the coating layer due to the anchor effect caused by biting of the hard particles into the copper alloy portions adhered on the base substrate or biting of the copper alloy particles into the hard particle portions adhered on the base substrate, upon spraying the copper alloy particles and the hard particles onto the base substrate. In the case in which the hard particle portions have the aforementioned non-spherical shape, the hard particles easily bite into the copper alloy portions adhered on the base substrate, and the copper alloy particles easily bite into the hard particle portions adhered on the base substrate.

However, it is needless to say that the scope of the present invention includes those cases in which the above effects are obtained by reasons other than those described above.

Fourth Embodiment

Next, a sliding member according to a fourth embodiment of the present invention will be described in detail, with reference to the drawings. The components identical to those described in the aforementioned embodiment will be assigned with the same reference signs, and descriptions thereof are omitted.

Figure 10:
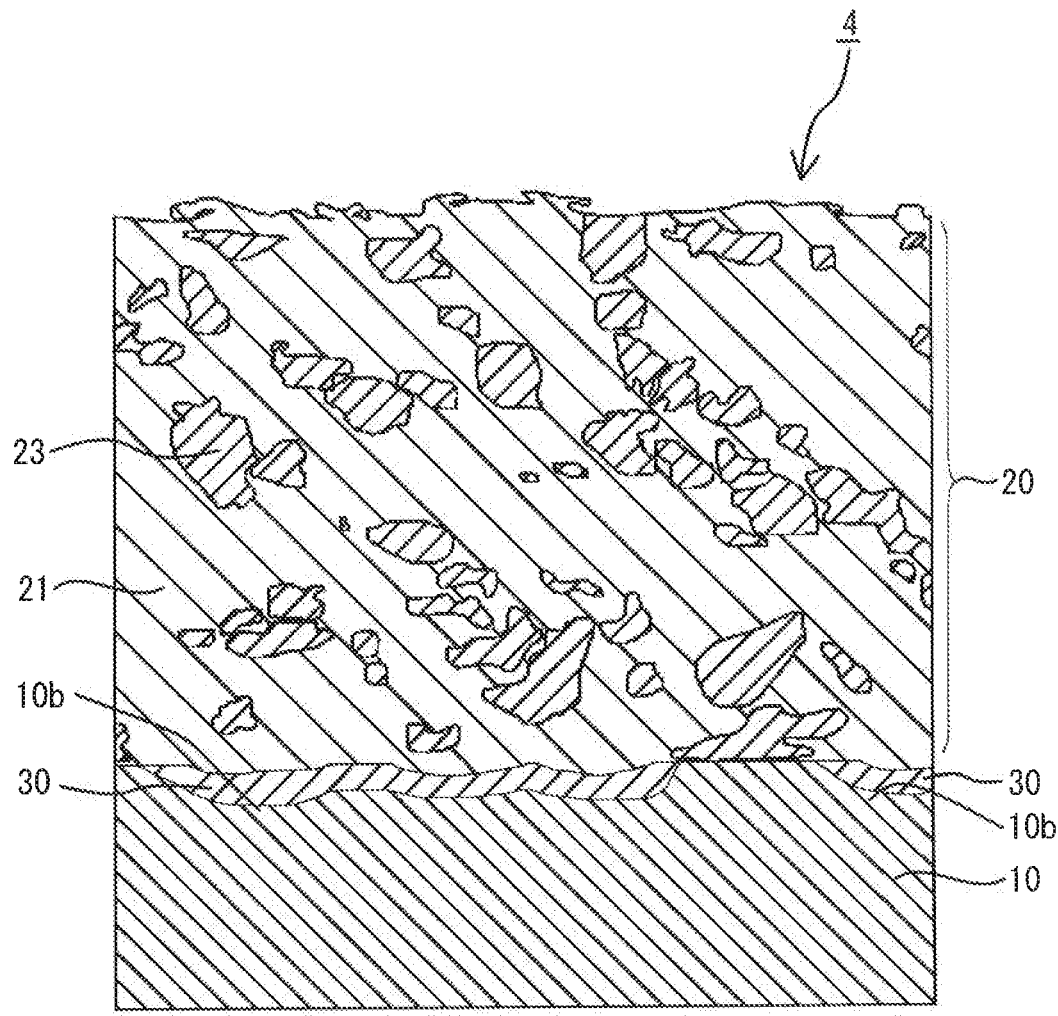
FIG. 10 is a schematic cross-sectional view of a sliding member according to a fourth embodiment of the present invention.

FIG. 10 is a schematic cross-sectional view of a sliding member according to the fourth embodiment of the present invention. As illustrated in FIG. 10, the sliding member 4 of the present embodiment is different from the sliding members of the first to third embodiments in that the sliding member 4 includes a predetermined intermediate layer 30 formed on the entire gap between the base substrate 10 and the coating layer 20. The predetermined intermediate layer 30 includes a diffusion layer or an intermetallic compound layer, or alternatively the diffusion layer and the intermetallic compound layer. In case the intermediate layer includes the diffusion layer, the intermediate layer may be the diffusion layer. In case the intermediate layer includes an intermetallic compound layer, the intermediate layer may be the intermetallic compound layer. Although not illustrated, it is needless to say that the scope of the present invention includes the case in which the coating layer has only the copper alloy portions among the copper alloy portions and the hard particle portions, the case in which the base substrate and the coating layer both have the plastically deformed portion, and the case in which one of the base substrate and the coating layer has the plastically deformed portion.

As described above, the sliding member of the present embodiment includes a base substrate, and a coating layer formed on the base substrate, and is a sliding member whose coating layer has the aforementioned predetermined copper alloy portions and further a hard particle portions being harder than the copper alloy portions, if necessary, these portions (e.g. a copper alloy portion to another copper alloy portion, a copper alloy portion to a hard particle portion, and a hard particle portion to another hard particle portion) being bonded to each other via the interfaces therebetween, and furthermore, including an intermediate layer containing at least one of a diffusion layer and an intermetallic compound layer, the intermediate layer being formed at least in a part of a gap between the base substrate and the coating layer. Thus, this imparts further excellent wear resistance. It is needless to say that at least one of the base substrate and the coating layer may have a plastically deformed portion.

It is currently assumed that the aforementioned effects are obtained based on the following reasons.

It is considered that the effects are obtained, for example, due to the followings: when the copper alloy particles as the material used in the manufacturing method of the sliding member are sprayed onto the base substrate, and the copper alloy particles collide with the base substrate, for example, that kinetic energy is partially converted into thermal energy; diffusion of a component element contained in the base substrate and at least one of the copper alloy particles and the copper alloy portions adhered onto the base substrate occur therebetween, so as to form the intermediate layer containing at least one of a diffusion layer and an intermetallic compound layer between the base substrate and the coating layer. This will be described in detail later.

Moreover, it is considered that the effects are obtained by, for example, due to the followings: when a mixture further containing the hard panicles is sprayed onto the base substrate, and the hard particles collide with the base substrate, in case, for example, the base substrate has on its surface an oxide coating that inhibits the adhesion of the base substrate and the coating layer, that oxide coating is removed, to expose and form a new interface of the base substrate, thus facilitating the diffusion of the component element.

However, it is needless to say that the scope of the present invention includes cases in which the aforementioned effects are obtained based on reasons other than those described above.

The intermediate layer 30 will be described in more detail. The intermediate layer includes a diffusion layer or an intermetallic compound layer, or alternatively includes the diffusion layer and the intermetallic compound layer. Suitable examples of the diffusion layer include those that have a gradient structure in its composition. However, the diffusion layer is not limited to those having a gradient structure in its composition. Moreover, although not particularly limited, suitable examples of the intermediate layer including the intermetallic compound layer include layers having, a structure in which the intermetallic compound layer intervenes between diffusion layers with a gradient structure in its composition. For example, the intermediate layer includes a component element contained in the base substrate and a component element contained in the copper alloy portions. Specifically, in case aluminum alloy is applied as the base substrate, an intermediate layer including an alloy that contains aluminum and copper is formed. However, the intermediate layer is not limited thereto. For example, when stainless steel (SUS) is applied for the base substrate, an intermediate layer including an alloy that contains a component element of the stainless steel (SUS) and copper is formed.

Fifth Embodiment

Next, a sliding member for an internal combustion engine according to a fifth embodiment of the present invention, namely, a sliding member for an internal combustion engine having the aforementioned sliding member at a sliding part of the internal combustion engine, will be described with reference to the drawings. It is needless to say that a front surface side of the coating layer serves as a sliding surface. Components identical to those described in the aforementioned embodiment will be assigned with the same reference signs, and descriptions thereof will be omitted.

Figure 11:
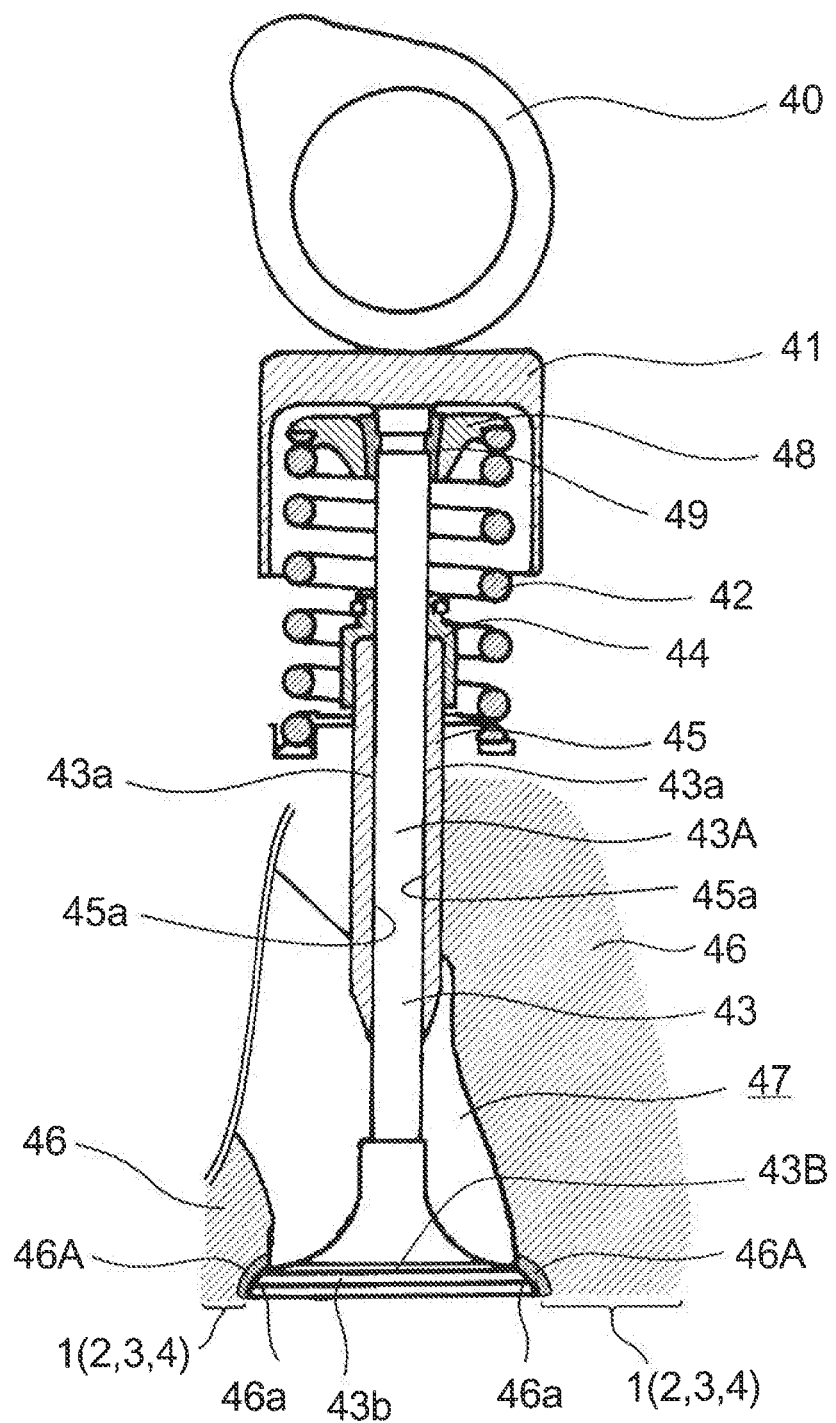
FIG. 11 is a schematic cross-sectional view of a sliding member for an internal combustion engine that includes the sliding member at a sliding part of the internal combustion engine.

FIG. 11 is a schematic cross-sectional view of the sliding member for the internal combustion engine that includes the sliding member at a sliding part of the internal combustion engine. To be more specific, FIG. 11 is a schematic cross-sectional view of a valve actuating mechanism including an engine valve. As illustrated in FIG. 11, when a cam lobe 40 rotates, a valve lifter 41 is pushed down while a valve spring 42 is compressed. Simultaneously, an engine valve 43 is pushed down by being guided by a valve guide 45 having a stem seal 44. As a result, the engine valve 43 separates from a seat part 46A for the engine valve 43 of a cylinder head 46 so that an exhaust port 47 communicates with a combustion chamber (not illustrated) (the engine valve open state). Thereafter, a further rotation of the cam lobe 40 causes the valve lifter 41, a retainer 48 and a cotter 49 to be pushed up along with the engine valve 43 due to a repulsion force of the valve spring 42. As a result, the engine valve 43 contacts the seat part 46A so that the exhaust port 47 is shut off from the combustion chamber (not illustrated) (the engine valve closed state). The engine valve 43 opens and closes in synchronization with the rotation of the cam lobe 40 in such way. As such, the valve stem 43A of the engine valve 43, while being lubricated with oil, is installed through the valve guide 45 that is press-fitted on the cylinder head 46 side. A valve face 43B of the engine valve 43, which serves as an on-off valve of the combustion chamber (not illustrated), is in or out of contact with the seat part 46A for the engine valve 43 of the cylinder head 46 during operation. While FIG. 11 illustrates the exhaust port 47 side, the sliding member of the present invention may also be applied on an intake port side (not illustrated).

The sliding member with the aforementioned coating layer, for example, the sliding member (1, 2, 3, 4) according to the aforementioned first to fourth embodiments, is applied to the cylinder head and a sliding surface 46a of the seat part 46A for the engine valve of the cylinder head, in which the sliding surface 46a is a sliding part of the engine valve. This imparts excellent wear resistance. Moreover, by applying the sliding member of the present invention to the cylinder head, it is possible to omit the press-fit valve sheet. As a result, it is possible to flexibly design the shape of an exhaust port and an intake port and expand the diameter of an engine valve, which can improve fuel consumption, power output, torque and the like of engines.

Although not shown in the Figures, the sliding member with the aforementioned coating layer, for example, the sliding member according to the first to fourth embodiments, is also applicable to, for example, one or both of the sliding surfaces of the valve stem and a counterpart valve guide, and/or, at least one position selected from the group consisting of the sliding surface of a valve stein end, the sliding surface of the valve face and the sliding surface of the press-fitted valve seat. This imparts excellent wear resistance.

That is, the cylinder head of the present embodiment preferably includes the sliding member of the aforementioned embodiments in the seat part for the engine valve. Another cylinder head of the present embodiment is a cylinder head including a valve seat having the sliding member of the aforementioned embodiments, and preferably it has the sliding member in the seat part for the engine valve of the valve seat. Furthermore, the valve seat of the present embodiment preferably includes the sliding member of the aforementioned embodiments in the seat part for the engine valve. Moreover, the engine valve of the present embodiment preferably includes the sliding member of the aforementioned embodiments in the valve face. Furthermore, another engine valve of the present embodiment preferably includes the sliding member of the aforementioned embodiments at a sliding part against the valve guide.

Sixth Embodiment

Next, a sliding member according to a sixth embodiment of the present invention will be described in detail, with reference to the drawings. It is needless to say that a front surface side of the coating layer serves as a sliding surface. Components identical to those described in the aforementioned embodiment will be assigned with the same reference signs, and descriptions thereof will be omitted.

Figure 12:
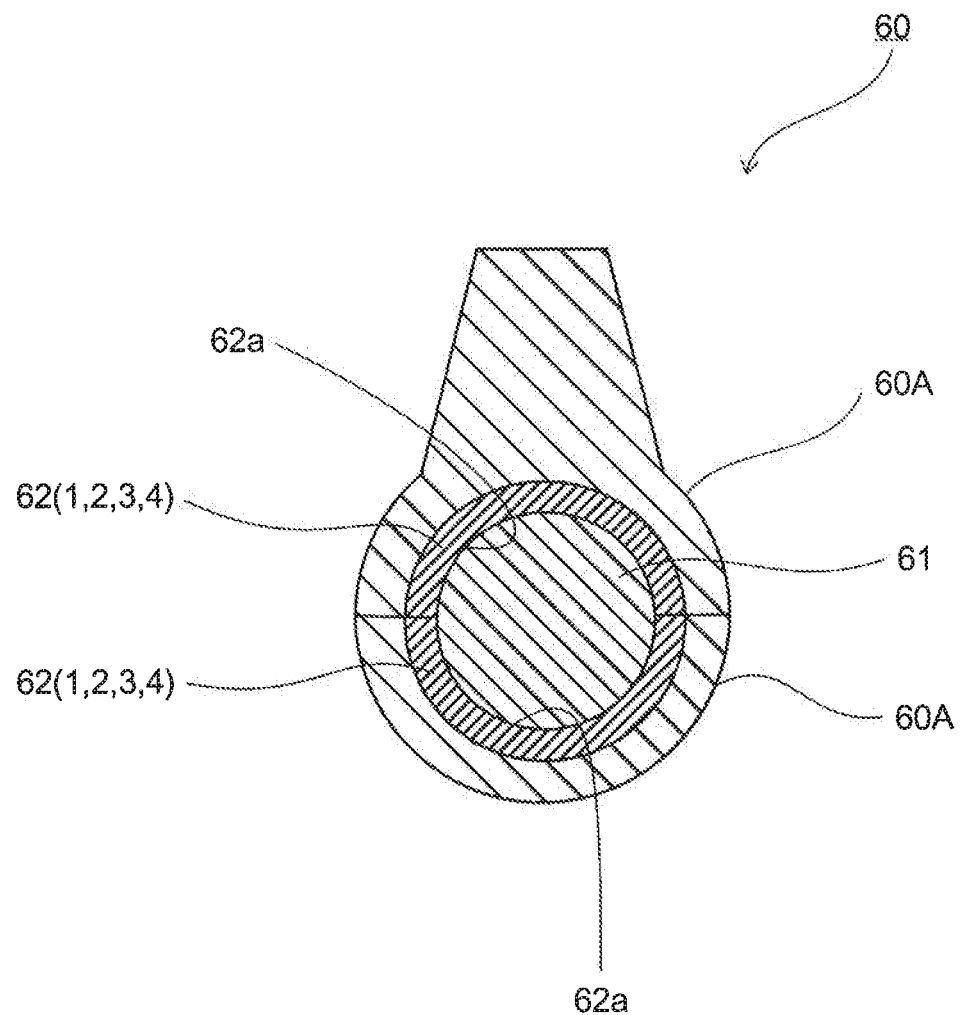
FIG. 12 is a schematic cross-sectional view of a bearing mechanism of an internal combustion engine that has a sliding member in a bearing metal of the bearing mechanism of the internal combustion engine.

FIG. 12 is a schematic cross-sectional view of a bearing mechanism of an internal combustion engine that includes the sliding member in a bearing metal of the bearing mechanism of the internal combustion engine. To be more specific, FIG. 12 is a schematic cross-sectional view of the bearing metal that serves as a sliding member of a connection rod. As illustrated in FIG. 12, a big end part 60A of the connection rod 60, which is located on a crank side (not shown), is divided into two, upper and lower parts. On the big end part 60A are disposed bearing metals 62, which are divided into two, for supporting a crank pin 61.

The aforementioned sliding member with the coating layer, for example, the sliding member (1, 2, 3, 4) according to the aforementioned first to fourth embodiments, is applied to sliding surfaces 62a as the bearing metals 62. This imparts excellent wear resistance.

Although not shown in the Figures, the aforementioned sliding member with the coating layer, for example, the sliding member according to the aforementioned first to fourth embodiments, is also applicable to the sliding surfaces of the bearing metals, which are divided into two, for supporting a piston pin of the connection rod, which is located at a small end part on a piston side (not shown). This imparts excellent wear resistance.

That is, the bearing mechanism of the internal combustion engine of the present embodiment preferably includes the sliding member of the aforementioned embodiments in the hearing metal of the bearing mechanism of the internal combustion engine. It is also possible to directly form the layer (directly form without using a metal) on the sliding surface on the big end part side of the connection rod. Moreover, it is also possible to directly form the layer (directly form without using a metal) on the sliding surface on the small end part side of the connection rod.

The sliding member for the internal combustion engine of the present embodiment may also be applied to a piston ring and a piston. Namely, it is preferable to apply the coating layer on the surface of the piston ring. Moreover, it is preferable to apply the coating layer on a ring groove inner surface of the piston. Furthermore, in the sliding member for the internal combustion engine of the present embodiment, it is preferable to apply the coating layer on an inner surface of a cylinder bore (this may serve as an alternative to the cylinder liner, or an alternative for bore thermal spraying). Moreover, in the sliding member for the internal combustion engine of the present embodiment, it is preferable to apply the coating layer on a metal of a journal of a crank shaft. Furthermore, in the sliding member for the internal combustion engine of the present embodiment, it is preferable to directly form a coating layer (directly form the coating layer without using a metal) onto the metal portion of the journal of the crank shaft. Moreover, in the sliding member for the internal combustion engine of the present embodiment, it is preferable to apply the coating layer on a surface of a metal of the journal of the camshaft. Furthermore, in the sliding member for the internal combustion engine of the present embodiment, it is preferable to directly from the coating layer (directly form the coating layer without using a metal) onto the metal portion of the journal of the camshaft. Moreover, in the sliding member for the internal combustion engine of the present embodiment, it is preferable to apply the coating layer on a cam lobe surface of the camshaft. Furthermore, in the sliding member for the internal combustion engine of the present embodiment, it is preferable to apply the coating layer on a metal of the piston and the piston pin. Moreover, in the sliding member for the internal combustion engine of the present embodiment, it is preferable to directly form the coating layer on a metal portion of the piston and the piston pin. Furthermore, in the sliding member for the internal combustion engine of the present embodiment, it is preferable to apply the coating layer on a surface of a piston skirt. Moreover, in the sliding member for the internal combustion engine of the present embodiment, it is preferable to apply the coating layer on a crown surface of a valve lifter. Furthermore, in the sliding member for the internal combustion engine of the present embodiment, it is preferable to apply the coating layer on a side surface of the valve lifter. Moreover, in the sliding member for the internal combustion engine of the present embodiment, it is preferable to apply the coating layer on a sliding surface against a valve lifter of a lifter bore in the cylinder head. Furthermore, in the sliding member for the internal combustion engine of the present embodiment, it is preferable to apply the coating layer on a surface of teeth of a sprocket (in this case, for example, the coating layer is formed on a sprocket made of aluminum sintered alloy instead of a sprocket made of iron sintered alloy). Moreover, in the sliding member for the internal combustion engine of the present embodiment, it is preferable to apply the coating layer to a pin of a chain. Furthermore, in the sliding member for the internal combustion engine of the present embodiment, it is preferable to apply the coating layer to a chain plate.

Moreover, in the sliding member in the aforementioned first to fourth embodiments, it is preferable to apply the coating layer on a surface of teeth of a gear other than a gear of the internal combustion engine (in this case, for example, a gear of an aluminum alloy is used instead of a steel gear, and the coating layer is formed on this aluminum alloy). Examples of the gear other than a gear of the internal combustion engine include differential gears for automobiles, generators for automobiles, and generators other than those for automobiles. Furthermore, the sliding member in the aforementioned first to fourth embodiments is preferably applied to general sliding bearings (meaning sliding bearings in a broad sense that is not a rolling bearings).

Next describes a method for manufacturing the sliding member in detail. The method for manufacturing the sliding member is, for example, a method for manufacturing a sliding member including the base substrate according to the aforementioned first to fourth embodiments, and a coating layer formed on the base substrate, wherein the coating layer has the aforementioned predetermined copper alloy portions, or the aforementioned predetermined copper alloy portions and hard particle portions, and these portions (e.g. a copper alloy portion to another copper alloy portion, a copper alloy portion to a hard particle portion, and a hard particle portion to another hard particle portion) are bonded to each other via the interfaces therebetween. The method for manufacturing the sliding member includes a step of thrilling a coating layer on the base substrate by spraying the aforementioned predetermined copper alloy particles or a mixture containing the aforementioned predetermined copper alloy particles and hard particles, onto the base substrate in a non-melted state, the coating layer having the aforementioned predetermined copper alloy portions, or the aforementioned predetermined copper alloy portions and the hard particle portions, and these portions (e.g. a copper alloy portion to another copper alloy portion, a copper alloy portion to a hard particle portion, and a hard particle portion to another hard particle portion) being bonded to each other via the interfaces therebetween.

As described above, the aforementioned predetermined copper alloy particles or the mixture containing the aforementioned predetermined copper alloy particles and the hard particles, the aforementioned predetermined copper alloy particles and the mixture being in a non-melted state to prevent additive elements from being precipitated, is sprayed onto the base substrate to form the coating layer having the aforementioned predetermined copper alloy portions, or the aforementioned predetermined copper alloy portions and the hard particle portions, in which these portions (e.g. a copper alloy portion to another copper alloy portion, a copper alloy portion to a hard particle portion, and a hard particle portion to another hard particle portion) are bonded to each other via the interfaces therebetween. Due to this, it is possible to efficiently form a coating layer excellent in wear resistance. In other words, by forming the coating layer by a method called kinetic spraying, cold spraying or warm spraying and the like, it is possible to efficiently form a coating layer having excellent wear resistance. However, the sliding member of the present invention is not limited to those manufactured by this method.

A more specific manufacturing method will be described in further details.

As described above, when the copper alloy particles or the mixture are sprayed onto the base substrate, it is preferred that the copper alloy particles or the mixture are sprayed onto the base substrate at a speed that forms a plastically deformed portion on at least one of the base substrate and the coating layer upon spraying the copper alloy particles on the base substrate. Due to this, it is possible to efficiently form a coating layer further excelling in wear resistance.

However, the speed for spraying the copper alloy particles is not limited to the aforementioned speed. For example, the particle speed preferably ranges from 300 m/s to 1200 m/s, more preferably from 500 m/s to 1000 m/s, still more preferably from 600 m/s to 800 m/s. The pressure of operating gas supplied for spraying the particles preferably ranges from 2 MPa to 5 MPa, more preferably from 3.5 MPa to 5 MPa. When the pressure of the operating gas is less than 2 MPa, a sufficient particle speed cannot be obtained, which may result in a large porosity. However, it is needless to say that these are not limited to the above-mentioned ranges and may be out of these ranges as long as the effects of the present invention can be exhibited.

The temperature of the operating gas is not particularly limited. However, for example, it ranges preferably from 400° C. to 800° C., more preferably from 600° C. to 800° C., When the temperature of the operating gas is less than 400° C., the wear resistance may decrease due to the large porosity. When the temperature of the operating gas is greater than 800° C., the nozzle may be clogged. However, it is needless to say that the temperature is not limited to these ranges and may be out of these ranges as long as the effects of the present invention can be exhibited.

The type of the operating gas is not particularly limited. However, examples of operating gas include nitrogen and helium. One type of the operating gas may be used alone, or more than one type of the operating gas may be used in combination. Further, a mixture of fuel gas and nitrogen may also be used.

After the coating layer is formed, the sliding member may be aged or tempered at 250° C. to 500° C. for 0.5 hour to 4 hours, for example. This can improve the wear resistance. This aging or tempering may be also performed, for example, by utilizing heat from a combustion chamber during a test run in an inspection conducted after assembling the engine.

Furthermore, the copper alloy particles used as the material are not particularly limited. However it is preferable to use those in a non-melted state, and made of the aforementioned predetermined copper alloy particles. It is needless to say that it is preferably a copper alloy prior to precipitation hardening. For example, the copper alloy particles are preferably in a supersaturated solid solution state. Since the copper alloy particles exhibit high ductility, in other words high deformability, in the supersaturated solid solution state, the coating layer can be formed efficiently, and film formability can be improved. The particles in the supersaturated solid solution state are not particularly limited. For example, it is preferable to use rapidly-solidified particles obtained by rapid solidification using atomization and the like. When the copper alloy particles collide with the base substrate or the like, fine hard phases (precipitation phases) are formed due to the pressure generated by the impact and frictional heat generated by a difference in deformation speed from that of the base substrate and the like upon the flattening of the particles. As a result, the coating layer increases in strength.

The copper alloy particles used as the material are not particularly limited. However a compressive strength of the particles is preferably 50 N/mm² to 110 N/mm². By forming the sliding member using such copper alloy particles, it is possible to efficiently form a coating layer excellent in wear resistance.

In the present invention, "compressive strength of the particles" is defined as a compressive strength, when a particle size in a load applied direction varies by 10% upon applying a load on the particles by a flat indenter or the like. The measurement method complies with JIS R 1639-5 "Test method of properties of fine ceramic granules Part 5: Compressive strength of a single granule", and a test load is 500 mN.

The hard particles used as the material are not particularly limited. However they are preferably in a non-melted state, preferably harder than the copper alloy particles, and preferably have a non-spherical shape. For example, it is preferable to apply alloy particles or ceramics particles, or a mixture containing these at any proportion. As the alloy particles, it is preferable to apply iron-based alloy particles, cobalt-based alloy particles, chromium-based alloy particles, nickel-based alloy particles, or molybdenum-based alloy particles, or alternatively a mixture containing these particles at any proportion.

Furthermore, the hard particles used as the material are not particularly limited. However it is preferable to use particles manufactured by water atomization. When particles are manufactured by water atomization, the droplets deform by the water hitting an electric droplet; at this time, the droplet is cooled by water and remains in the deformed shape, and the non-spherical shape is formed. On the other hand, with a technique, in which gas is sprayed, the cooling will be insufficient and the particles will return back to their spherical shape.

The grain size of the copper alloy particles and the hard particles used as the material is not particularly limited. However, the grain size is preferably 150 μm or less, and more preferably 75 μm or less. The grain size of the particles may be adjusted with a sieve or by a publicly known suitable method in the art. Here, as the "grain size", d95 on number basis, measured and calculated with an image analytical particle size distribution measuring instrument, can be used. The "particle size" for measuring and calculating such a grain size may be, for example, a maximum distance between any two points on the contour of an observed particle (in an observation plane). However, the "particle size" is not limited thereto and, for example, the diameter of an equivalent circle of an observed particle (in an observation plane) may be employed. Furthermore, d95 on number basis, measured and calculated with a laser diffraction scattering particle size distribution measuring instrument, may also be used. By forming the coating layer using such copper alloy particles and hard particles, it is possible to efficiently form a coating layer excellent in wear resistance.

The average particle size of the copper alloy particles and the hard particles used as the material are not particularly limited. However, the average particle size ranges, for example, preferably from 5 μm to 40 μm, more preferably from 20 μm to 40 μm. If the average particle size is less than 5 μm, the low fluidity may cause insufficient supply of the particles. If the average particle size exceeds 50 μm, the insufficient particle speed in film forming may result in imperfect film forming. As the "average particle size", for example, an average particle size (d50) on number basis may be used, in which d50 is measured and calculated with the image analytical particle size distribution measuring instrument. As the "particle size" for measuring and calculating the average particle size can employ, for example, a maximum distance between any two points on the contour of an observed particle (in an observation plane) may be employed. However, the "particle size" is not limited thereto and, for example, a diameter of an equivalent circle of the observed particle (in an observation plane) may be employed. Alternatively, an average particle size (d50) on number basis that is measured and calculated with the laser diffraction scattering particle size distribution measuring instrument may be used. However, it is needless to say that these are not limited to these ranges and may be out of these ranges as long as the effects of the present invention can be exhibited.

Moreover, although not particularly limited, the average particle size of the copper alloy particles is preferably smaller than the average particle size of the hard particles. By forming the sliding member using such copper alloy particles and hard particles, it is possible to efficiently form a coating layer having excellent wear resistance.

An aspect ratio in a median value of the copper alloy particles and hard particles used as the material is not particularly limited. As such an aspect ratio, an aspect ratio measured and calculated with the image analytical particle size distribution measuring instrument may be used. It is of course possible to measure and calculate the aspect ratio using a scale, by enlarging the scanning electron microscopic (SEM) image of each particle.

EXAMPLES

The following describes the present invention in further detail with Examples. However, the present invention is not limited to these Examples.

Example 1

First, copper-nickel-silicon alloy powder (composition: Cu-3Ni-0.7Si, water-atomized particles, grain size (d95): 60.7 μm, average particle size (d50): 27.7 μm, aspect ratio (median value): 1.59, compressive strength 67.1 N/mm$^2$, Vickers hardness: 64.1 HV 0.01) was prepared as the copper alloy particles serving as raw material.

The grain size (d95) is on number basis, and was measured and calculated with an image analytical particle size distribution measuring instrument. As the "particle size", the maximum distance between any two points on the contour of the observed particle (an observation plane) was employed. The average particle size 0.50) is on number basis, and was measured and calculated with an image analytical particle size distribution measuring instrument. As the "particle size", the maximum distance between any two points on the contour of the observed particle (an observation plane) was employed. Furthermore, as for the aspect ratio (median value), the scanning electron microscopic (SEM) images were enlarged and measurement and calculation were performed with a scale. Moreover, as for the compressive strength, a load was applied to the particles with a micro compression tester (MCT-510) manufactured by Shimadzu Corporation, and the compressive strength was measured when the particle size varied by 10% in the direction of the load. To calculate an arithmetic mean, measurements were made for ten pieces. Furthermore, the Vickers hardness was measured and calculated according to the Vickers hardness test defined in the Japanese Industrial Standards (JIS Z 2244). To calculate an arithmetic mean, measurements were made for ten pieces.

Meanwhile, a preprocessed aluminum base substrate was prepared by preprocessing an aluminum base substrate (Japanese industrial Standards H 4040 A5056), assuming a target thickness of a coating layer of 0.2 mm in a state, in which processing of a seat part for an engine valve of a cylinder head is completed.

Then, the prepared aluminum base substrate was mounted on a rotating table, and the prepared copper alloy particles were sprayed onto the prepared aluminum base substrate with a high-pressure cold spray device (PCS-1000, manufactured by Plasma Giken Co., Ltd., operating gas-type: nitrogen, temperature: 600° C., particle speed: 700 m/s to 750 m/s, pressure: 4 MPa) while rotating the rotating table, to form a coating layer with a thickness of 0.4 mm to 0.5 mm on the base substrate.

Thereafter, it was finished by machining into the shape of the seat part for the engine valve of the actual cylinder head, to obtain the sliding member of the present Example. The thickness of the coating layer was 0.2 mm (the same applied hereinafter).

Examples 2 to 4

As shown in Table 1, the sliding member of each Example Was obtained by repeating the same operations as Example 1, except that the specifications and mixed ratios of the copper alloy particles and the hard particles were changed. "Co—Mo—Cr" in Table 1 means cobalt-based alloy.

Comparative Examples 1 to 3

As shown in Table 2, the sliding member of each Example was obtained by repeating the same operations as Example 1, except that the specifications of the copper alloy particles were altered.

TABLE 1

Figure 14:
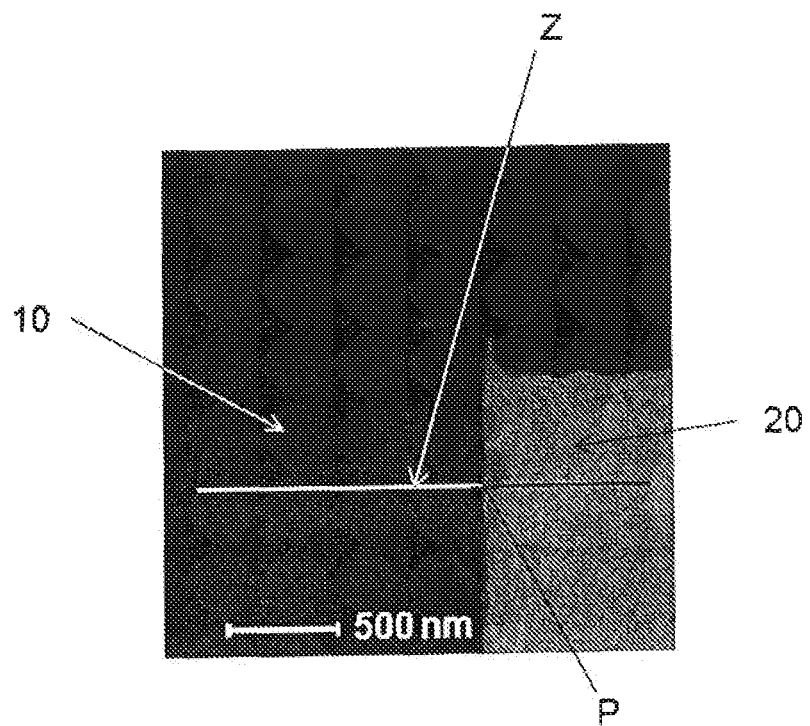
FIG. 14 is a transmission electron microscopic (TEM) cross-sectional image of the sliding member of Example 3.
Figure 15:
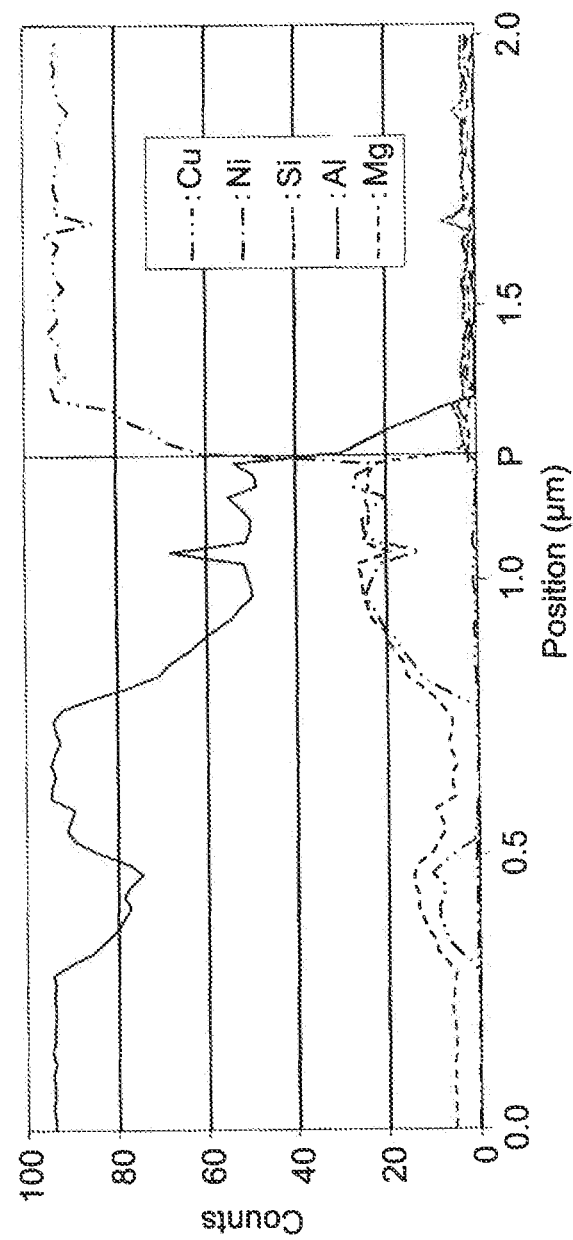
FIG. 15 is a graph illustrating the result of an energy dispersive X-ray (EDX) analysis of the sliding member of Example 3.

|  |  | Example 1 | Example 2 | Example 3 | Example 4 |
|---|---|---|---|---|---|
| Copper alloy particles | Material type | Cu—3Ni—0.7Si | Cu—3Ni—0.7Si—1V | Cu—3Ni—0.7Si | Cu—3Ni—0.7Si |
|  | Particle manufacturing method | Water atomizing | Water atomizing | Water atomizing | Water atomizing |
|  | Grain size (d95) (μm) | 60.7 | 56.5 | 60.7 | 60.7 |
|  | Average particle size (d50) (μm) | 27.7 | 27.9 | 27.7 | 27.7 |
|  | Aspect ratio (median value) | 1.59 | 1.48 | 1.59 | 1.59 |
|  | Compressive strength (N/mm$^2$) | 67.1 | 99.4 | 67.1 | 67.1 |
|  | Vickers hardness (HV 0.01) | 64.1 | 74.2 | 64.1 | 64.1 |
| Hard particles | Material type | — | — | Co—Mo—Cr | Co—Mo—Cr |
|  | Particle manufacturing method | — | — | Water atomizing | Water atomizing |
|  | Grain size (d95) (μm) | — | — | 64.6 | 33.6 |
|  | Average particle size (d50) (μm) | — | — | 37.5 | 13.5 |
|  | Aspect ratio (median value) | — | — | 1.96 | 1.96 |
|  | Vickers hardness (HV 0.025) | — | — | 783 | 957 |
| Film formation conditions | Mixed proportion (mass ratio) Copper alloy particles:Hard particles | 100:0 | 100:0 | 50:50 | 50:50 |
|  | Gas temperature (° C.) | 600 | 600 | 600 | 600 |
|  | Gas pressure (Mpa) | 4 | 4 | 4 | 4 |
|  | Particle speed (m/s) | 700-750 | 700-750 | 700-750 | 700-750 |
| Coating layer | Vickers hardness of Copper alloy portion (HV 0.1) | 211 | 222 | 221 | 217 |
|  | Vickers hardness of Hard particle portion (HV 0.025) | — | — | 940 | 975 |
|  | Proportion of Hard particle portion (area %) | — | — | 15 | 13 |
|  | Porosity (area %) | 1.0 area % or less | 1.0 area % or less | 1.0 area % or less | 1.0 area % or less |
|  | State of interface between base substrate and coating layer | — | — | FIGS. 14, 15 | — |
| Wear resistance (wear loss (μm)) |  | 39.5 | 41.5 | 14.1 | 20.4 |

TABLE 2

|  |  | Comparative Example 1 | Comparative Example 2 | Comparative Example 3 |
|---|---|---|---|---|
| Copper alloy particles | Material type | Cu—1.4Ni—0.3Si | Cu—6Ni—1.5Si | Cu—14Ni—3Si |
|  | Particle manufacturing method | Water atomizing | Water atomizing | Water atomizing |
|  | Grain size (d95) (μm) | 58.2 | 57.8 | 60.2 |
|  | Average particle size (d50) (μm) | 27.3 | 26.8 | 27.3 |
|  | Aspect ratio (median value) | 1.51 | 1.52 | 1.63 |
|  | Compressive strength (N/mm$^2$) | 62 | 103 | 169 |
|  | Vickers hardness (HV 0.01) | 74.1 | 102 | 183 |
| Hard particles | Material type | — | — | — |
|  | Particle manufacturing method | — | — | — |
|  | Grain size (d95) (μm) | — | — | — |
|  | Average particle size (d50) (μm) | — | — | — |
|  | Aspect ratio (median value) | — | — | — |
|  | Vickers hardness (HV 0.001) | — | — | — |
| Film formation conditions | Mixed proportion (mass ratio) Copper alloy particles:Hard particles | 100:0 | 100:0 | 100:0 |
|  | Gas temperature (° C.) | 600 | 600 | 600 |
|  | Gas pressure (Mpa) | 4 | 4 | 4 |
|  | Particle speed (m/s) | 700-750 | 700-750 | 700-750 |
| Coating layer | Vickers hardness of Copper alloy portion (HV 0.1) | 153 | 259 | 332 |
|  | Vickers hardness of Hard particle portion (HV 0.025) | — | — | — |
|  | Proportion of Hard particle portion (area %) | — | — | — |
|  | Porosity (area %) | 1.0 area % or less | 1.0 area % or less | 1.0 area % or less |
|  | State of interface between base substrate and coating layer | — | — | — |
| Wear resistance (wear loss (μm)) |  | 397.9 | 69.7 | 62.2 |

The Vickers hardness of the copper alloy portions and hard particle portions in the coating layer of each Example in Tables 1 and 2 were measured and calculated according to the Vickers hardness test defined in the Japanese Industrial Standards (JIS Z 2244). To calculate an arithmetic mean, measurements were made at ten positions. Moreover, observations of scanning electron microscope (SEM) images and transmission electron microscope (TEM) images, and results of energy dispersive X-ray (EDX) spectrometry were used in determining the measured position. Furthermore, the proportion of the hard particle portions and the porosity in the cross section of the coating layer of each Example were calculated by performing multiple times of observation of the scanning electron microscopic (SEM) images of the cross section of the coating layer and image processing such as binarization of the scanning electron microscopic (SEM) cross-sectional images. The precipitation phase of the copper alloy portion of each Example was specified by observation of a transmission electron microscopic (TEM) images of the cross section of the coating layer and energy dispersive X-ray (EDX) analysis. The presence or absence of an intermediate layer and the presence or absence of a plastically deformed portion in the cross section of the sliding member of each Example was determined by observation of the scanning electron microscopic (SEM) images of the cross section of the coating layer, and energy dispersive X-ray (EDX) analysis. In each of Examples 1 to 4, a precipitation phase was observed, and a plastically deformed portion was observed in the base substrate and the coating layer.

Performance Evaluation

The following performances were evaluated for the aforementioned sliding member of each Example.

Wear Resistance

Figure 13:
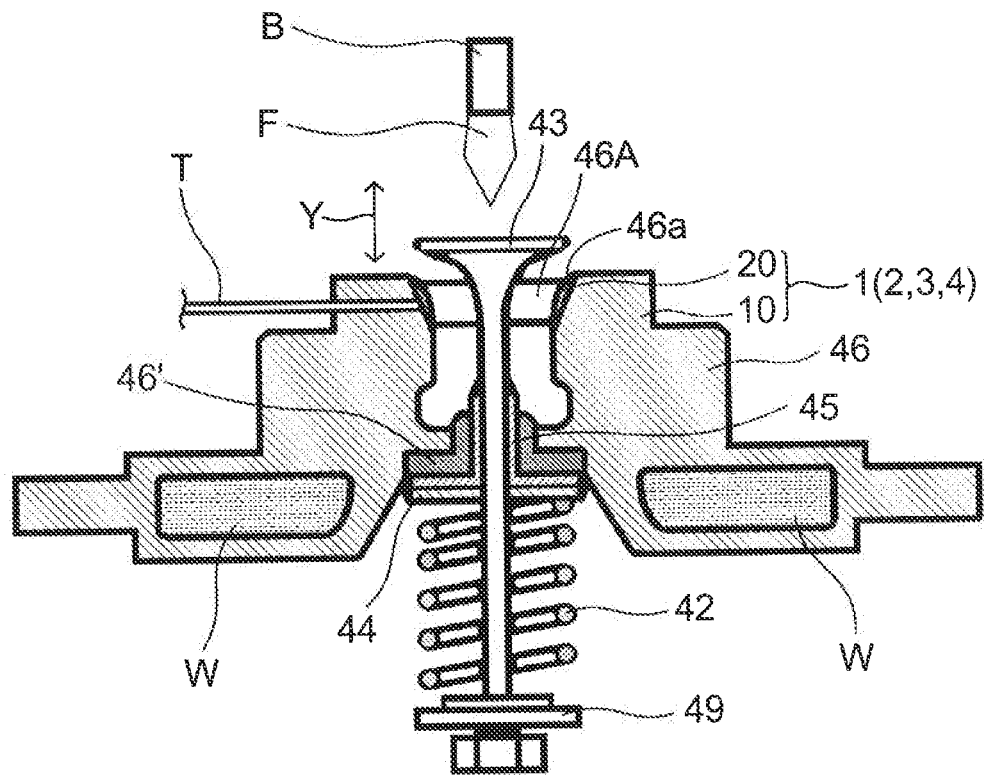
FIG. 13 is a cross-sectional view illustrating an overview of a wear tester.

FIG. 13 is a cross-sectional view illustrating the contour of a wear tester. As illustrated in FIG. 13, a wear tester resembling a valve actuating mechanism of an engine is fabricated from actual engine parts such as a valve spring 42, an engine valve 43, a stem seal 44, a valve guide 45, cylinder heads 46, 46' and a cotter 49. The sliding member (1, 2, 3, 4) of each of the above Examples was applied as a seat part 46A for the engine valve 43 of the cylinder head 46. The sliding member (1, 2, 3, 4) includes the predetermined coating layer 20 formed on the base substrate 10. The engine valve 43 is open in the Figure. The engine valve 43 reciprocates in a vertical direction as illustrated by the arrow Y in the Figure by means of an eccentric cam (not shown) so that the engine valve 43 repeatedly opens and closes. The sliding surface 46a of the seat part 46A for the engine valve 43 of the cylinder head 46 is in a high-temperature environment by means of a flame F of a gas burner B. The temperature of the seat part 46A is measured with a thermometer T. Cooling water W circulates within the cylinder head 46.

The wear loss was measured and calculated with the aforementioned wear tester under the following test conditions. Specifically, the shape of the seat part for the engine valve of the cylinder head was acquired with a shape measuring instrument before and after the test. The wear loss was measured at four points, and the average thereof was calculated to serve as the wear loss. The results are shown in Tables 1 and 2.

Test Conditions

Temperature: 300° C. (Assuming a seat part for an engine valve of a cylinder head on an exhaust port side);
Number of inputs: 540000 times As seen from Tables 1 and 2, Examples 1 to 4 within the scope of the present invention exhibited less wear loss than Comparative Examples 1 to 3 that are out of scope of the present invention, and had excellent wear resistance even at high temperatures, Examples 1 to 4 also employ copper alloy particles, thus are excellent in thermal conductivity.

It is considered that the sliding members having excellent wear resistance as Examples 1 to 4 were obtained by forming, on the base substrate, the coating layer including the aforementioned predetermined copper alloy portions, preferably the aforementioned predetermined copper alloy portions and hard particle portions, in which the coating layer had these portions (e.g. a copper alloy portion to another copper alloy portion, a copper alloy portion to a hard particle portion, and a hard particle portion to another hard particle portion) bonded to each other via interfaces therebetween.

Moreover, it is considered that the sliding members having the excellent wear resistance as Examples 1 to 4 were obtained, because at least one of the copper alloy portions had at least one precipitation phase including nickel silicide inside the copper alloy portions and/or in the interface.

Moreover, it is considered that the sliding members having the excellent wear resistance as Examples 1 to 4 were obtained, because at least one of the base substrate and the coating layer had a plastically deformed portion.

Furthermore, it is considered that the sliding members having the excellent wear resistance as Examples 1 to 4 were obtained, because the porosity in the cross section of the coating layer was 1 area % or less.

FIG. 14 is a transmission electron microscopic (TEM) cross-sectional image around the interface between the base substrate 10 and the coating layer 20 of the sliding member of Example 3. FIG. 15 is a graph showing the result of an energy dispersive X-ray (EDX) analysis (linear analysis) of the sliding member of Example 3 along the line Z in FIG. 14, The point P in FIG. 14 and the point P in FIG. 15 indicate the same location. In FIG. 15, the position 0.0 μm corresponds to the end part of the line Z on the base 20 side in FIG. 14, and the position 2.0 μm corresponds to the end part of the Z on the coating layer 20 side.

As seen from FIGS. 14 and 15, the sliding member includes the base substrate 10 of an aluminum alloy, and the coating layer 20 of a copper alloy formed on the base substrate 10, and an intermediate layer is formed between the base substrate 10 and the coating layer 20. The intermediate layer is formed in a position of approximately 0.75 μm to 1.31 μm. Further, the diffusion layers are formed in the position of approximately 0.75 μm to 0.96 μm and in the position of approximately 1.23 μm to 1.31 μm. Furthermore, the diffusion layers have a gradient structure in the composition. In the position of approximately 0.96 μm to 1.23 μm, a ratio of aluminum, magnesium and copper is about Al:Mg:Cu=2:1:1 (atomic ratio), showing that an intermetallic compound layer is formed.

In this way, it is also considered that the sliding member having excellent wear resistance as Example 3 was obtained, because the sliding member included the intermediate layer formed at least in a part of a gap between the base substrate and the coating layer, the intermediate layer including both of the diffusion layer and the intermetallic compound layer. Further, it is also considered that the sliding member having high wear resistance as Example 3 was obtained, because the intermediate layer with the diffusion layer having a gradient structure in its composition was provided, or because the intermediate layer was provided, the intermediate layer having the structure in which the intermetallic compound layer was disposed between the diffusion layers with a gradient structure in its composition.

Furthermore, it is also considered that the sliding members having the excellent wear resistance as Examples 1 to 4 were obtained, because the hard particle portions were derived from hard particles such as cobalt-based alloy particles.

Furthermore, it is also considered that the sliding members having excellent wear resistance as Examples 1 to 4 were obtained, because the manufacturing method of the aforementioned sliding member had a step of spraying, onto the base substrate, a mixture containing the aforementioned predetermined copper alloy particles in a non-melted state, preferably, a mixture containing the aforementioned predetermined copper alloy particles and hard particles in a non-melted state, to form a coating layer on the base substrate.

Furthermore, it is also considered that the sliding members having excellent wear resistance as Examples 1 to 4 were obtained, because, when the aforementioned predetermined copper alloy particles or the mixture were sprayed on the base substrate, the copper alloy particles or the mixture were sprayed onto the base substrate at such a speed that the plastically deformed portion was formed on at least one of the base substrate and the coating layer upon spraying the copper alloy particles onto the base substrate.

Moreover, it is also considered that the sliding members having excellent wear resistance as Examples 1 to 4 were obtained, because the copper alloy particles were prepared by water atomization, for the copper alloy particles were in a supersaturated solid solution state, or the copper alloy particles were rapidly-solidified particles.

Moreover, it is also considered that the sliding members having the excellent wear resistance as Examples 1 to 4 were obtained, because a compressive strength of the copper alloy particles was 50 N/mm² to 110 N/mm².

Furthermore, it is also considered that the sliding members having the excellent wear resistance as Examples 1 to 4 were obtained, because the copper alloy particles and hard particles have a grain size of 75 μm or smaller.

Furthermore, it is also considered that the sliding member having the excellent wear resistance as Example 3 was obtained, because the average particle size of the copper alloy particles was smaller than the average particle size of the hard particles.

While the present invention is described with some embodiments and examples, the present invention is not limited thereto, and a variety of variations can be made within the scope of the present invention.

For example, the components described in the aforementioned embodiments and examples are not limited to the individual embodiments and examples. For example, the structural features, such as specifications and proportional ratio of the copper alloy particles and the hard particles as well as the film forming conditions may be varied. Further, the structural features of each embodiment or each example may be combined differently from the combinations in the aforementioned embodiments and examples.

REFERENCE SIGNS LIST 1,2,3,4: Sliding member
10: Base substrate
10b: Plastically deformed portion
20: Coating layer
20A: Pore
20b: Plastically deformed portion
21: Copper alloy portion
21a: Interface
23: Hard particle portion
25: Precipitation phase
30: Intermediate layer
40: Cam lobe
41: Valve lifter
42: Valve spring
43: Engine valve
43A: Valve stem
43a: Sliding surface
43B: Valve face
43b: Sliding surface
44: Stem seal
45: Valve guide
45a: Sliding surface
46, 46': Cylinder head
46A: Seat part
46a: Sliding surface
47: Exhaust port
48: Retainer
49: Cotter
60: Connection rod
60A: Big end part
61: Crank pin
62: Bearing metal
62a: Sliding surface
B: Gas burner
F: Flame
T: Thermometer
W: Cooling water

The invention claimed is:

1. A sliding member, comprising:
a base substrate; and
a coating layer formed on the base substrate;
wherein the coating layer includes copper alloy portions derived from precipitation hardening copper alloy particles, the copper alloy portions are bonded to each other via interfaces between the copper alloy portions, and the coating layer includes hard particle portions derived from hard particles, the hard particle portions being harder than the copper alloy portions,
wherein an aspect ratio of the hard particle portions is not less than 1.3 in its median value,
wherein the copper alloy portions contain nickel and silicon as additive elements, and the copper alloy portions contain 2 to 5 percent by mass of nickel.

2. The sliding member according to claim 1, wherein at least one of the copper alloy portions contains at least one precipitation phase including nickel silicide inside the copper alloy portions and/or in an interface of the copper alloy portions.

3. The sliding member according to claim 1, wherein at least one of the base substrate and the coating layer comprises at least one plastically deformed portion.

4. The sliding member according to claim 1, wherein a porosity in a cross section of the coating layer is 3 area % or less.

5. The sliding member according to claim 1, comprising at least one intermediate layer including at least one of a diffusion layer or an intermetallic compound layer, the at least one intermediate layer being formed at least in a part of a gap between the base substrate and the coating layer.

6. The sliding member according to claim 1, wherein the hard particle portions comprise at least one type of hard particles selected from the group consisting of: iron-based alloy particles, cobalt-based alloy particles, chromium-based alloy particles, nickel-based alloy particles, molybdenum-based alloy particles, or ceramic particles.

7. The sliding member according to claim 1, wherein the copper alloy portions contain 3 to 5 percent by mass of nickel.

8. An internal combustion engine, the internal combustion engine comprising a sliding member at a sliding part of the internal combustion engine,
the sliding member comprising:
a base substrate; and
a coating layer formed on the base substrate;
wherein the coating layer includes copper alloy portions derived from precipitation hardening copper alloy particles, the copper alloy portions are bonded to each other via interfaces between the copper alloy portions, and the coating layer includes hard particle portions derived from hard particles, the hard particle portions being harder than the copper alloy portions,
wherein an aspect ratio of the hard particle portions is not less than 1.3 in its median value,
wherein the copper alloy portions contain nickel and silicon as additive elements, and the copper alloy portions contain 2 to 5 percent by mass of nickel.

\* \* \* \* \*